(12) United States Patent
Yoshikawa et al.

(10) Patent No.: US 6,654,176 B2
(45) Date of Patent: Nov. 25, 2003

(54) MICROLENS ARRAY, A METHOD FOR MAKING A TRANSFER MASTER PATTERN FOR MICROLENS ARRAY, A CONCAVE AND CONVEX PATTERN OBTAINED FROM THE TRANSFER MASTER PATTERN, A LAMINATE FOR TRANSFER, A DIFFUSE REFLECTION PLATE AND A LIQUID CRYSTAL DISPLAY DEVICE

(75) Inventors: Takehisa Yoshikawa, Yokohama (JP); Yukio Maeda, Yokohama (JP); Masato Taya, Kyowa (JP); Tomohisa Ohta, Nogi (JP); Isao Ishizawa, Kanuma (JP); Makoto Satoh, Kyowa (JP)

(73) Assignees: Hitachi, Ltd., Tokyo (JP); Hitachi Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/196,475

(22) Filed: Jul. 17, 2002

(65) Prior Publication Data
US 2003/0039035 A1 Feb. 27, 2003

(30) Foreign Application Priority Data
Aug. 7, 2001 (JP) ........................................ 2001-239208
Mar. 8, 2002 (JP) ........................................ 2002-063558

(51) Int. Cl.$^7$ ........................ G02B 27/10; B29D 11/00; G02F 1/1335
(52) U.S. Cl. ...................... 359/627; 359/619; 359/626; 359/599; 264/2.7; 349/112
(58) Field of Search ................ 359/619, 626, 359/627, 599; 451/42, 43; 264/2.7; 349/95, 112, 64, 32

(56) References Cited

U.S. PATENT DOCUMENTS
5,182,663 A * 1/1993 Jones .......................... 359/113
6,018,419 A * 1/2000 Cobb, Jr. et al. ............ 359/599
2003/0053009 A1 * 3/2003 Sato et al. ..................... 349/95

FOREIGN PATENT DOCUMENTS
EP 0 265 007 A1 * 4/1988

* cited by examiner

Primary Examiner—Georgia Epps
Assistant Examiner—M. Hasan
(74) Attorney, Agent, or Firm—Antonelli, Terry, Stout & Kraus, LLP

(57) ABSTRACT

A microlens configuration having a substantially circular form is constituted of a part of one circle or aspheric curve at any section when a section is taken at a face which is vertical to a major axis or a minor axis of the microlens configuration. A laminate for transfer includes a concave and convex pattern having concave and convex forms of a transfer master pattern, in which a number of such configurations as mentioned above are arranged, transferred to a substrate to be transferred, and a thin film layer laminated on the concave and convex surface thereof wherein a surface of the thin film layer opposite to a surface in contact with a provisional support is used as a bonding face to an application substrate. Moreover, a method for making a diffuse reflector plate comprises the steps of holding the laminate for transfer against the application substrate in contact with the bonding face of the thin film layer, separating the provisional support, and forming a reflective film on the concave and convex surface of the thin film layer.

16 Claims, 17 Drawing Sheets

MICROLENS ARRAY, A METHOD FOR MAKING A TRANSFER MASTER PATTERN FOR MICROLENS ARRAY, A CONCAVE AND CONVEX PATTERN OBTAINED FROM THE TRANSFER MASTER PATTERN, A LAMINATE FOR TRANSFER, A DIFFUSE REFLECTION PLATE AND A LIQUID CRYSTAL DISPLAY DEVICE

FIELD OF THE INVENTION

This invention relates to the art of fields necessary for controlling light through convergence, diffusion, reflection, diffraction and the like, e.g. the art of fields such as of display, illumination, medical treatment, optical communication, computers and the like, which require microlenses. More specifically, the invention relates to a microlens array employed for the manufacture of a reflection-type liquid crystal display device and a diffuse reflector plate of a solar cell requiring a high efficiency, a method for making a transfer master pattern for a microlens array, a concave and convex pattern obtained from the transfer master pattern, a laminate for transfer, and a liquid crystal display device.

DESCRIPTION OF THE RELATED ART

A microlens array has been used for forming a diffraction grating filter, optical parts for optical communication or a focussing glass of camera parts. The microlens array takes a round or circular form having a diameter of approximately 10 to 30 μm with a depth of 0.6 to 50 μm. Usually, the microlens array is designed in a spherical form which is axially symmetrical with respect to the center thereof. For the measure of manufacturing a microlens, an indentation system set out in Japanese Unexamined Patent Publication Nos. Hei 9-327860 and Hei 11-42649 and a photolithographic system (hereinafter referred to merely as photolitho system) as proposed in Japanese Unexamined Patent Publication No. Hei 6-194502 wherein etching is performed after exposure to light are known. A fly cutting system, in which a lens face is rotationally cut while rotating a cutting tool, is known.

An instance of a lens array where microlenses are arranged at equal pitches includes a diffraction grating filter used as an optical part or an optical communication part. On the other hand, an instance of a microlens array of the type wherein microlenses are arranged at uneven pitches includes a reflector plate for preventing iridescent reflection and reflecting white light or a reflection electrode member for a reflection-type liquid crystal. For this purpose, it is necessary that several millions to several tens of millions of microlenses be formed.

For the processing of spherically designed microlenses, such microlenses are frequently formed according to the photolitho method. As a measure of mechanically controlling the processing dimension of a microlens, an indentation technique and a fly cutting technique using rotary cutting are used, respectively.

A liquid crystal display (hereinafter abbreviated as LCD) makes use of such features as to be thin, small in size and low in consumption power and has now been in use as a display unit of watches, desk-top calculators, TV sets, personal computers and the like. Further, in recent years, color LCD has been developed and started to be employed in various fields including, aside from those of OA devices and AV devices, those of navigation systems, view finders, monitors of personal computers and the like. Thus, it has been expected that its market will be drastically extended. Especially, attention has been paid to reflection-type LCD, in which light incident from outside is reflected for display, for application to a portable end instrument from the standpoint that back light is unnecessary with small consumption power, and thus, thinning and weight saving are enabled. For conventional reflection-type LCD, a twisted nematic system and a super twisted nematic system have been adopted. These systems become dark in display because ½ of incident light is not utilized for the display by the influence of linear polarizers. To avoid this, the display mode of a system wherein the polarizer is reduced to one in number and is combined with a phase plate or a phase transfer guest or host system has been proposed.

In order to obtain a bright display by efficiently utilizing external light in reflection-type LCD, it is necessary that the intensity of light scattered in directions vertical to a display face be increased with respect to incident light from all angles. To this end, a reflection film on a reflector plate should be so controlled as to impart appropriate reflection characteristics thereto.

A method of forming a diffuse reflector plate has been proposed in Japanese Unexamined Patent Publication No. Hei 4-243226, in which a photosensitive resin is coated onto a substrate and patterned by use of a photomask to form fine irregularities, each with a size of several micrometers, and a metal thin film is formed thereon.

Further, Japanese Unexamined Patent Publication No. Hei 11-42649 proposes a method of making a transfer master pattern wherein an indentater having a spherical tip is pressed thereby continuously forming concave configurations and also a method of making a reflector plate by transferring the pattern to a reflector substrate.

Moreover, a method of forming, on a substrate, a film made of fine particles dispersed in a resin so as to control diffusability in Japanese Unexamined Patent Publication No. Hei 7-110476.

Where a microlens array is formed according to a photolitho method, this process is carried out through chemical reaction, making it difficult to control the shape or configuration of individual microlens faces. Especially, in a reflector plate of the type wherein microlenses are arranged at irregular or uneven pitches, the sizes of adjacent microlenses differ from each other with a problem on the control of depth, so that the control of the configuration becomes difficult. As a result, the arrangement of axially symmetric spheres is difficult.

FIG. 20 is a perspective view of an indentation tool and an indentation master block showing a method of forming microlenses by an indentation system. In order that an axially symmetric spherical configuration is formed in the indentation system shown in the figure, it is necessary to avail a tool having a spherical form. For the tool, a diamond indentater 60 is usually employed. If the diamond indentater 60 can be constituted of a single crystal, a tool having a completely spherical face can be obtained. Diamond has a harder face and a softer face depending on the crystal orientation, so that it is difficult to finish the tool as having a complete sphere. Strictly speaking, the configuration of the tool has anisotropy. Especially, if an aspheric surface configuration in an axially symmetric form is desired, it is very difficult to obtain an intended configuration profile. In this sense, a difficulty is involved in forming a microlens 62 of a desired configuration in an indentation matrix 63 by means of the diamond indentater 60. Although such a tool is available when using a super hard material with which an intended tool shape is liable to obtain, the tool made of a polycrystal material is disadvantageous in that not only the surface roughness at the tip thereof becomes poor, but also durability is not good when a great number of indentations are formed. Moreover, the indentation method has the problem that with the irregular pitches ascribed to the plastic flow of material, the configurations differ depending on the density of the irregular pitches.

With the fly cutting using rotary cutting, the profile accuracy of a tool is two-dimensionally controlled, making it possible to process the tool as having a configuration of high accuracy. In order to obtain an axially symmetric microlens, it is necessary to set the radius of cutting edge of a tool and the position of a rotation center in high accuracy, under which where the diameter of a microlens is at about 10 µm or below, it is very difficult to determine the center of rotation. In addition, the axially symmetric configuration of an aspheric face is difficult to process.

In the method set forth in Japanese Unexamined Patent Publication No. Hei 4-243226, the formation of concave and convex configurations includes the steps of exposing every substrate to light through a photomask and developing, so that the procedure is complicated, and thus, is neither low in cost or high in productivity. Additionally, the random formation of patterns over a large area is difficult in the step of making a photomask.

In the method of Japanese Unexamined Patent Publication No. Hei 11-42649, a concave configuration with several microns in size is formed one by one by impressing a fine indentater, thus involving a difficulty in processing over a large area.

In Japanese Unexamined Patent Publication No. Hei 11-38214, a method is proposed, in which granules are jetted against striped grooves to randomly make concave portions. However, it is difficult to obtain a satisfactory processing accuracy.

In the method of Japanese Unexamined Patent Publication No. Hei 7-110476, some problems are found in that a difficulty is involved in uniform dispersion of fine particles, and a reflection intensity within a necessary range is obtained only when reflection at a direct reflection angle increases, thus causing the occurrence of a light source being reflected.

SUMMARY OF THE INVENTION (OBJECT AND SUMMARY)

An object of the invention is to solve the drawbacks of the above-stated prior art and to provide a technique of manufacturing a microlens array in an axially symmetric spheric or aspheric surface, a microlens array having excellent reflection characteristics, a transfer master pattern and a concave and convex pattern employed for the manufacture of a diffuse reflector plate such as reflection-type LCD having good reflection characteristics, methods for making these patterns, a laminate for transfer using same, a diffuse reflector plate, and a reflection-type liquid crystal device using the reflector plate.

In order to achieve the object of the invention, a microlens array is provided, according to a first embodiment of the invention, which comprises microlenses, each arranged such that a major axis and a minor axis thereof, which pass through a center of a substantially circular profile and intersect at 90 degrees, are substantially equal in length to each other, and sectional forms at faces vertical to an axis parallel to the major axis or the minor axis, respectively, have the same curved shape at any position.

According to a second embodiment of the invention, a microlens array is provided, which comprises microlenses, each having a profile of a substantially circular form and arranged such that a major axis and a minor axis thereof, which pass through a center of the substantially circular form and intersect at 90 degrees, are equal in length to each other, and sectional forms at faces vertical to an axis parallel to the minor axis or the major axis, respectively, have a size of radius at any position.

According to a third embodiment of the invention, a microlens array is provided, which comprises microlenses, each having a profile of a substantially circular form and arranged such that a major axis and a minor axis thereof, which pass through a center of the substantially circular form and intersect at 90 degrees, are equal in length to each other, and sectional forms at faces vertical to an axis parallel to the minor axis or the major axis, respectively, have a given aspheric form.

According to a fourth embodiment of the invention, a microlens array is provided, which comprises microlenses, each arranged such that in a major axis and a minor axis thereof intersecting at 90 degrees, sectional forms at faces vertical to the major axis or minor axis, respectively, have the same curve or the same form of a combination of a curved line and a straight line in the respective directions at any position.

According to a fifth embodiment of the invention as set forth in the first to third embodiments, a curved face constituting the microlens surface at a horizontal face of a transfer master pattern forming the microlenses has a tangential angle of 23 degrees or below.

According to a sixth embodiment of the invention, a method for making a microlens transfer master pattern is provided, which comprises forming a microlens configuration in a substrate by controlling a cutting tool having the same nose or edge profile as a shape in section or sectional form of one of a minor axis and a major axis of a microlens so that the cutting tool draws a locus of a sectional form of the other axis.

According to a seventh embodiment of the invention, a method for making a transfer master pattern for a microlens array is provided, which comprises the steps of forming a nose profile of a diamond tip serving as a cutting tool in the same sectional form as one of a major axis or a minor axis of a microlens, and processing a substrate by controlling a locus of the cutting tool so as to make the same sectional form of the other axis of the microlens, thereby forming a microlens configuration.

In an eighth embodiment of the invention as set forth in the sixth or seventh embodiment, the microlens is shaped substantially in a circular form wherein when a diameter of the circle is taken as D and a radius of the nose profile is taken as R, D/R is 0.73 or below.

In a ninth embodiment of the invention as set forth in the sixth or seventh embodiment, the microlens is formed by moving one of the cutting tool or the substrate in a horizontal direction and moving a drive mechanism for fine movement in vertical directions.

In a tenth embodiment of the invention as set forth in the ninth embodiment, the drive mechanism for fine movement is made of an piezoelectric element, and the microlens is formed by applying a voltage to the piezoelectric element and moving the cutting tool in vertical directions by a very small degree.

In an eleventh embodiment of the invention, a transfer master pattern of a reflector plate member comprises microlenses, each having a profile of a substantially circular form wherein a major axis and a minor axis thereof pass through a center of the substantially circular form and intersect at 90 degrees are substantially equal in length to each other and sectional forms of faces vertical to an axis parallel to the major axis or the minor axis are in the same curved shape at any position, the microlenses being formed at irregular pitches on a plane and a pitch between adjacent microlenses is within a range of 50 to 100% of a radius of the microlenses.

In a twelfth embodiment of the invention, a transfer master pattern of a reflector plate member comprises microlenses, each having a major axis and a minor axis thereof which intersect at 90 degrees and in which sectional forms of faces vertical to the major axis or the minor axis are in the same curved line or in the same form of a combination of a curved line and a straight line in the respective directions at any position, the microlenses being formed at irregular pitches on a plane and a pitch between adjacent microlenses is within a range of 50 to 100% of a width of the microlenses.

In a thirteenth embodiment as set forth in the sixth, seventh or eighth embodiment, a method for making a transfer master pattern of a reflector plate member is provided, which comprises forming, at irregular pitches on a plane, microlenses each having a profile of a substantially circular form wherein a major axis and a minor axis thereof that pass through a center of the circular form and intersect at 90 degrees are substantially equal in length to each other and sectional forms of faces vertical to an axis parallel to the minor axis or the major axis are in the same curved line at any position, and setting a pitch between adjacent microlenses within a range of 50 to 100% of a radius of the microlenses.

In a fourth embodiment of the invention as set forth in the sixth or seventh embodiment, a method for making a transfer master pattern of a reflector plate member is provided, which comprises forming, at irregular pitches on a plane, microlenses whose major axis and minor axis intersect at 90 degrees, in such a way that sectional forms of faces vertical to the major axis or the minor axis are in the same curved line or in the same form of a combination of a curved line and a straight line in the respective directions at any position, and setting a pitch between adjacent microlenses within a range of 50 to 100% of a width of the microlenses.

In a fifteenth embodiment of the invention, a method for making a concave and convex pattern is provided wherein the transfer master pattern set forth in the eleventh to fourteenth embodiments is provided and a substrate to be transferred is held against the transfer master pattern to form a concave and convex pattern.

In a sixteenth embodiment of the invention as set forth in the fifteenth embodiment, the substrate to be transferred is made of a laminate including a plastic film or an underlying layer. The plastic film or underlying layer is not critical with respect to the type of material so far as it ensures faithful reproduction of a transfer master pattern with respect to the transfer configuration and high stability in configuration.

In a seventeenth embodiment of the invention, the concave and convex pattern is made according to the method set forth in the fifteenth or sixteenth embodiment.

In an eighteenth embodiment of the invention, a laminate for transfer is formed by providing the concave and convex pattern set forth in the seventeenth embodiment as a provisional support, and laminating a thin film layer on the concave or convex microlens configuration pattern surface of the provisional support so that a surface of the thin film layer opposite to a surface in contact with the provisional support serves as a bonding face to an application substrate.

In a nineteenth embodiment as set forth in the eighteenth embodiment, a protective film is further laminated on the bonding face of the thin film layer.

In accordance with a twentieth embodiment of the invention, a method for making a diffuse reflector plate is provided, which comprises the steps of holding the transfer laminate set forth in the nineteenth embodiment, from which the protective film has been removed, against the application substrate in such a way that the bonding face of the thin film layer is in contact with the substrate, separating the provisional support, and forming a reflective film on concave and convex pattern surface of the thin film layer.

In a twenty and first embodiment of the invention, a method for making a diffuse reflector plate, which comprises the steps of holding the concave and convex pattern set forth in the seventeenth embodiment against a thin film layer formed on a protective substrate so that the concave and convex pattern surface is in contact therewith, separating the concave and convex pattern, and forming a reflective film on a surface on which the concave and convex pattern surface of the thin film layer is transferred.

In a twenty and second embodiment, a reflective film is laminated on the concave and convex surfaces of the concave and convex pattern set forth in the fifteenth embodiment.

In a twenty and third embodiment, a liquid crystal display device is provided, which comprises the diffuse reflector plate manufactured according to the method for making a diffuse reflector plate as set forth in the eighteenth or nineteenth embodiment.

In the practice of the invention, the microlens can be processed by cutting with use of a diamond bite, and the profile control of a cutting tool is based on the two-dimensional profile pattern control of a cutting edge, so that a tool of high precision can be obtained. This tool is used and controlled with respect to a desired sectional form or an R face relative to a member to be processed, under which the processing is performed such that the direction of cutting is coincident with a direction extending along one of the axes passing through the center of microlens and intersecting at 90 degrees. In this way, the sectional form relative to the central line parallel to the cutting direction results in the same form as the tool profile. With respect to the sectional form relative to a central line along a direction at right angles to the cutting direction, the dimension obtained is based on the control of movement of the tool. In both cases, the dimension can be mechanically controlled, so that a microlens configuration pattern of high precision can be formed. Hence, when using the microlenses obtained according to the method of the invention without resorting to the technique of axially symmetric formation, a lens array of high precision can be formed.

Further, where the microlens configuration pattern of the invention is used as a transfer master pattern of a reflection member for transfer shaping, a great number of microlens configurations are contiguously formed in the surface of a substrate for the transfer master pattern. In this case, the resultant concave microlens configurations should preferably be arranged randomly rather than regularly.

The configuration of the transfer master pattern is reversely transferred to a material to be transferred such as a film or the like thereby providing a concave or convex microlens configuration pattern such as a concave and convex pattern-bearing film or the like. This is provided as a provisional support and a thin film layer is laminated on the concave and convex surfaces to obtain a laminate for transfer. The laminate is brought into contact with an application substrate (perpetual substrate) made of a glass substrate or the like in such a way that the surface of the thin film layer that is not in contact with the provisional support is held against the perpetual substrate, followed by separating the provisional support and forming a reflective film on the thin film layer. As a result, a diffuse reflector plate can be manufactured at high productivity and a large-sized diffuse reflector plate can be efficiently produced. A substrate for master pattern (which may be used as a transfer master pattern) wherein a great number of microlens configurations have been contiguously formed is used to make a reverse transfer pattern based thereon, and a plurality of the reverse transfer patterns are connected with one another and provided as a master pattern to make a further reverse transfer master pattern. When the last-mentioned master pattern is used, a large-sized diffuse reflector plate can be manufactured at higher productivity.

Alternatively, the diffuse reflector plate may be manufactured by forming a reflective film on the concave or convex surfaces of the concave and convex pattern used as a provisional support, laminating a thin film layer thereon to provide a laminate for transfer, bringing a surface of the thin film layer, which is opposite to the surface in contact with the provisional support, into contact with the perpetual substrate to hold the film against the substrate, and separating the provisional support.

Still alternatively, the diffuse reflector plate having excellent reflection characteristics may be likewise manufactured by transferring the concave or convex surfaces of the concave and convex pattern to the thin film layer preliminarily formed on the perpetual substrate while bringing the concave or convex surfaces into contact with the thin film layer to hold the surfaces against the layer, and forming a reflective film on the thin film layer.

Because the individual concave and convex configurations of the transfer master pattern are so controlled as to reduce reflection at a direct reflection angle, the reflection of a light source per se is lessened, so that a diffuse reflector plate having a uniform reflection intensity over a necessary range can be readily manufactured.

The diffuse reflector plate of the invention has concave and convex configurations with good diffuse reflection characteristics formed in high reproducibility and can be manufactured by a simple procedure.

This and other objects, features and advantages of the invention will be apparent from the following more particular description of preferred embodiments of the invention, as illustrated in the accompanying drawings.

DESCRIPTION OF THE PREFERRED EMBODIMENTS

Reference is now made to the accompanying drawings to illustrate the preferred embodiments of the invention.

It will be noted that in the practice of the invention, one of diameters of a microlens that pass through the center of a microlens and intersect at right angles with each other is referred to as major axis and the other referred to as minor axis. In this connection, however, irrespective of the terms of the minor axis and the major axis, the case where the minor axis and the major axis are equal to each other in length is within the scope of the invention.

Figure 1A:
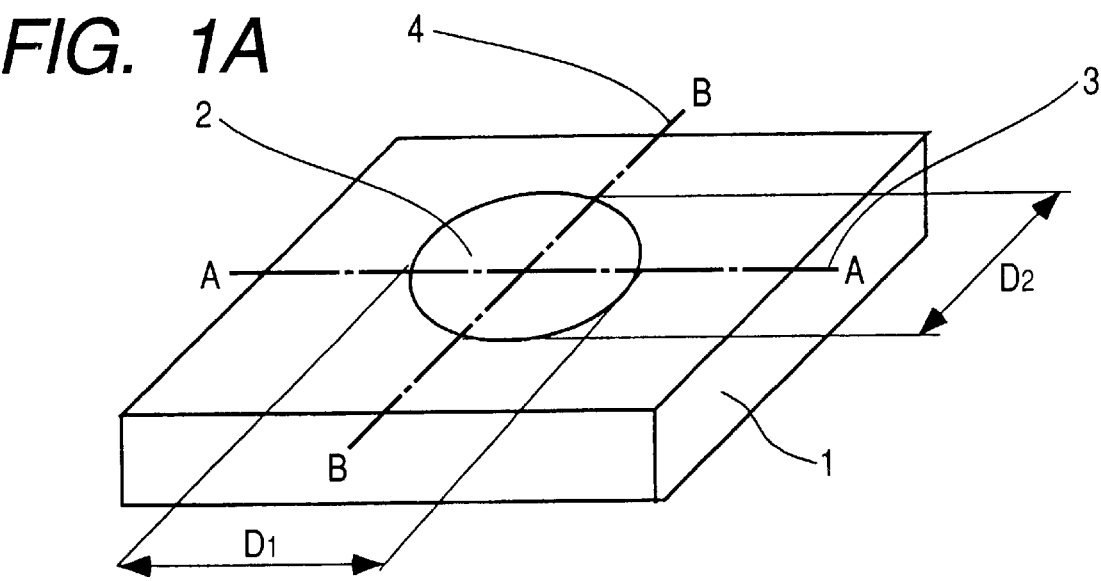
FIG. 1A is a perspective view of a microlens configuration according to the invention.
Figure 1B:
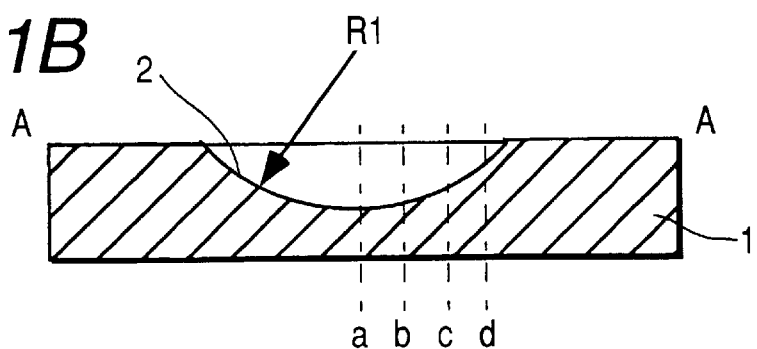
FIG. 1B is a sectional view taken along line A—A of FIG. 1A.
Figure 1C:
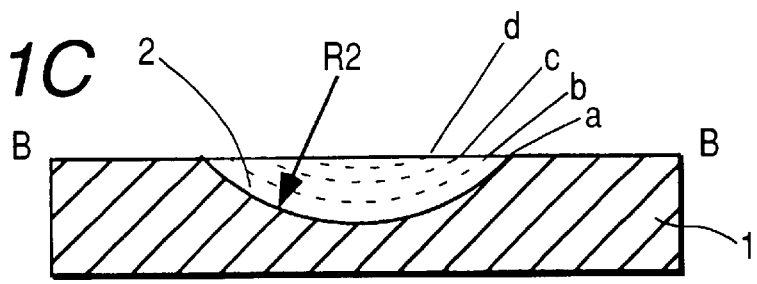
FIG. 1C is a sectional view taken along line B—B of FIG. 1A.
Figure 1D:
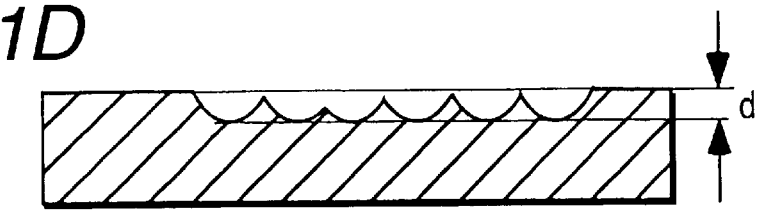
FIG. 1D is a sectional view showing a microlens transfer master pattern having a number of microlens configurations.

FIG. 1A is a perspective view showing a microlens configuration according to the invention, FIG. 1B is a sectional view, taken along line A—A of FIG. 1A, FIG. 1C is a sectional view, taken along line B—B of FIG. 1A, and FIG. 1D is a sectional view showing a microlens transfer master pattern having a number of microlens configurations. In FIG. 1, a transfer master pattern is indicated as 1 and is provided with a lens face 2. Reference numeral 3 indicates an X central line passing through the center of the lens face 2, and reference numeral 4 indicates a Y central line which is vertical to the X central line 3 and passes through the center of the lens face 2. The diameter of the lens face 2 along the central line 3 is taken as D1 and the diameter of the lens face 2 along the Y central line 4 is taken as D2. Although the diameters D1, D2 have substantially the same length, one diameter is hereinafter referred to as major axis and the other diameter referred to as minor axis in order to distinguish the diameters D1, D2 from each other. The sectional form of the X central line 3 is shown in FIG. 1B that is a section taken along the line A—A of FIG. 1A, and the sectional form of the Y central line 4 is shown in FIG. 1C that is a section taken along the line B—B.

The microlens configuration of this example has a radius R1 in respect of the sectional form passing through the X central line 3, and a radius R2 in the sectional form passing through the Y central line. In this condition, when the sectional form is taken at any position of the lens face with respect to the face vertically intersecting with the X central line 3, the sectional form of the radius R2 that is a sectional form of the Y central line is obtained. More particularly, in FIG. 1B, the sectional forms of lines a to d are such that like the circles a to d indicted by dotted lines in FIG. 1C, all the circles a to d, respectively, have the radius R2. Where the sectional form is taken with respect to the face vertically intersecting with the Y central line 4, the sectional forms, taken at any position of the lens face, are those forms of radius R1 which correspond to the sectional form of the X central line 3.

The application of the microlens configuration of this example makes it possible to form a microlens-shaped transfer master pattern of high precision based on the values of design. In this example, the dimensions at the microlens face 2 are such that D1=10 μm, D2=10 μm, R1=20 μm and R2=20 μm.

FIG. 1D is a sectional view of a transfer master pattern of microlenses provided with a number of lens faces, showing that the depth of the lens face 2 is d.

Figure 17A:
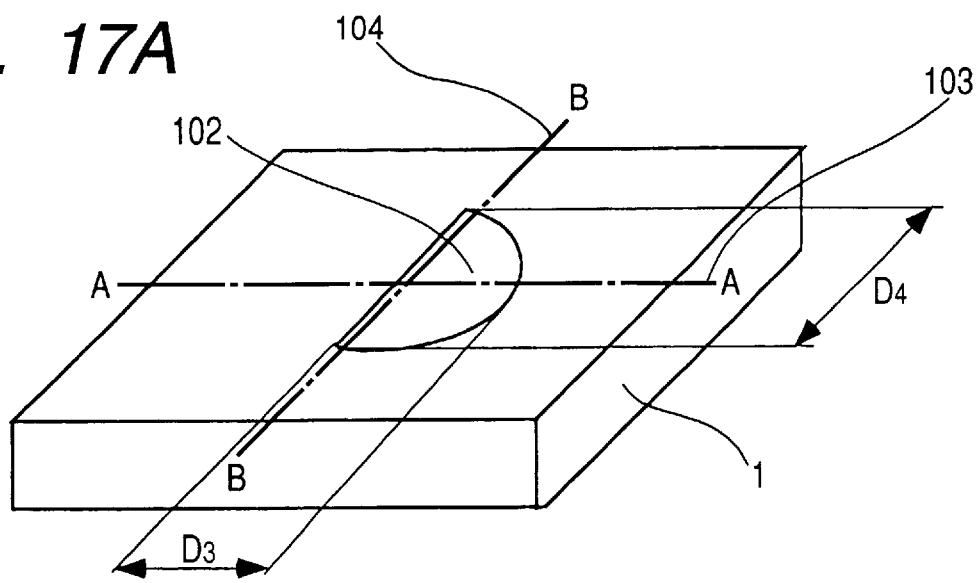
FIG. 17A is a perspective view showing a half moon-shaped microlens configuration according to the invention.
Figure 17B:
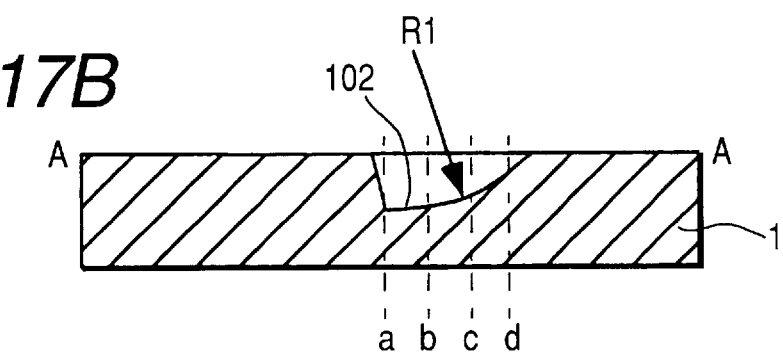
FIG. 17B is a sectional view, taken along line A—A of FIG. 17A.
Figure 17C:
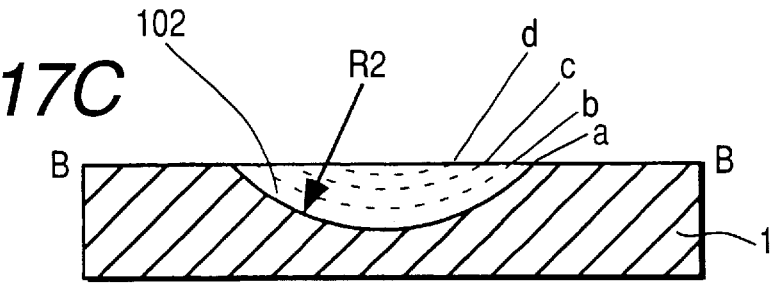
FIG. 17C is a sectional view, taken along line B—B of FIG. 17A.
Figure 17D:
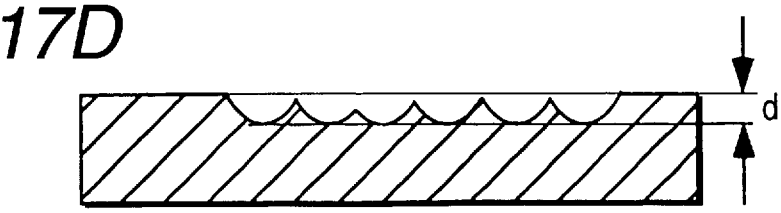
FIG. 17D is a microlens transfer master pattern provided with a number of microlens configurations.

FIG. 17A is a perspective view showing a half moon-shaped microlens configuration according to the invention, FIG. 17B is a sectional view, taken along the line A—A of FIG. 17A, FIG. 17C is a sectional view, taken along the line B—B of FIG. 17A and FIG. 17D shows a microlens transfer master pattern having a number of microlens configurations therein. In FIG. 17, reference numeral 1 indicates a transfer master pattern provided with a lens face 102 having a half moon-shaped profile. Reference numeral 103 indicates an X central line that equally divides a distance along the height of the lens face 102, and reference numeral 104 indicates a Y parallel line that is vertical to the X central line 103 and is parallel to the linear portion of the half moon-shaped lens face 102. The width of the lens face 102 over the X central line 103 is taken as D3 and the distance of the lens face 102 over the Y parallel line 104 is taken as D4. The sectional form of the X central line 103 is shown in FIG. 17B which is a sectional view, taken along the line A—A of FIG. 17A, and the sectional form of the Y central line 4 is shown in FIG. 17C which is a sectional view, taken along the line B—B of FIG. 17A.

The microlens configuration of this example has such a profile that it has a sectional form passing through the X central line 103 and having a radius R1 along with a linear portion. With respect to the face that vertically intersects with the X central line 103, the sectional form at any position of the lens face is one having a radius R2 that is the sectional form of the Y parallel line 104. More particularly, in FIG. 17B, the sectional forms at lines a to d, respectively, have a radius R2, like the circles a to d indicted by dotted lines in FIG. 17C. Moreover, where a sectional form is taken at the face vertically intersecting with the Y central line 104, a sectional form is obtained, which has the same profile as to be constituted of a radius R1 and a linear portion at any position of the lens face and which corresponds to the sectional form of the X central line 103.

The application of the microlens configuration of this example enables one to constitute a highly accurate microlens-shaped transfer master pattern based on the values of design.

Figure 2A:
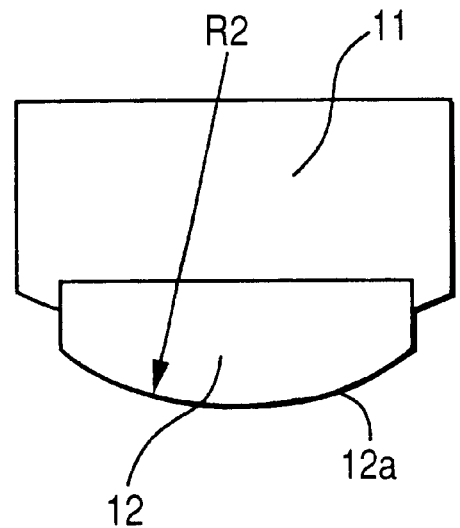
FIG. 2A is a front view showing a cutting tool used for the manufacture of a transfer master pattern for forming a microlens array according to the invention.
Figure 2B:
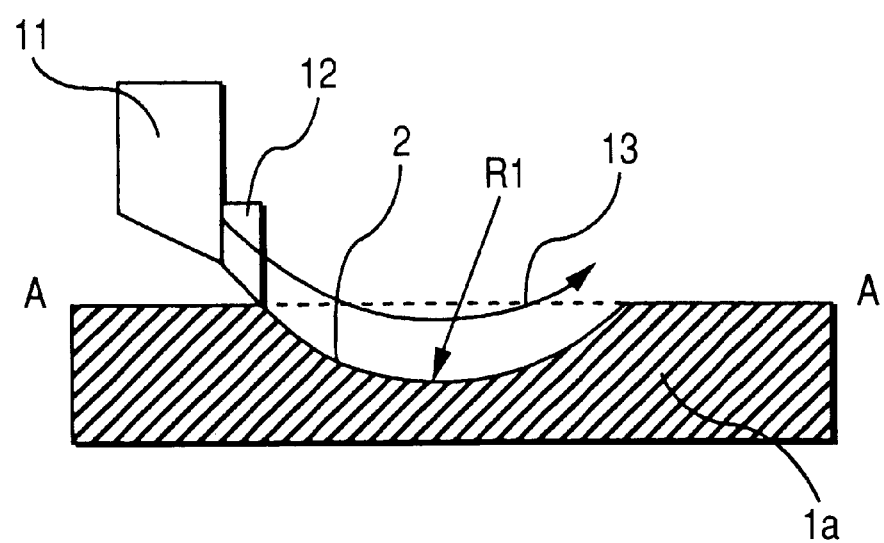
FIG. 2B is a side section of the cutting tool and a transfer master pattern.

FIG. 2A is a front view of a cutting tool used to make a transfer master pattern for forming a microlens array according to the invention, and FIG. 2B is a sectional side view of the cutting toll and the transfer master pattern. In this example, a lens face 2 is formed according to a cutting system using a diamond bite. In the figures, reference numeral 11 indicates a cutting tool and reference numeral 12 indicates a diamond tip. The shape of a nose profile 12a at the tip end of the diamond tip 12 has a sectional form of one direction in the course of the formation of the lens face of a microlens. More particularly, the sectional form selected among the sectional forms of the lens face 2 shown in FIG. 1 is so shaped as to provide a radius R1 as expressed by a curve at the side of the A—A section. A tool moving locus 13 is so controlled on a processing device (not shown) that the cutting tool 11 of FIG. 2 is moved along the locus of radius R1 relative to a material, in which the transfer master pattern is formed, i.e. a substrate 1a, with which when the lens face is cut once, a microlens can be formed.

The tool moving locus 13 of the cutting tool is transferred to the lens face 2 to make the A—A sectional form of a microlens configuration shown in FIG. 1B. The nose profile 12a of the diamond tip results in the B—B sectional form of the microlens configuration shown in FIG. 1C.

With respect to the tool moving locus 13, a commercially available super precision processing machine is used, and the cutting tool 11 and the transfer master pattern 1 are, respectively, attached to a drive shaft of the processing machine, followed by relatively moving the cutting tool 11 and the transfer master pattern to obtain a processed transfer master pattern 1. In view of the fact that the moving locus of the tool is so small as in the order of sub-microns and for the purpose of reducing the geometric error ascribed to the back-lash of the drive shaft of the processing machine, the movement of the cutting tool 11 is performed by use of a drive mechanism for fine movement using a piezoelectric element, thereby obtaining a transfer master pattern having excellent geometric precision.

Figure 18A:
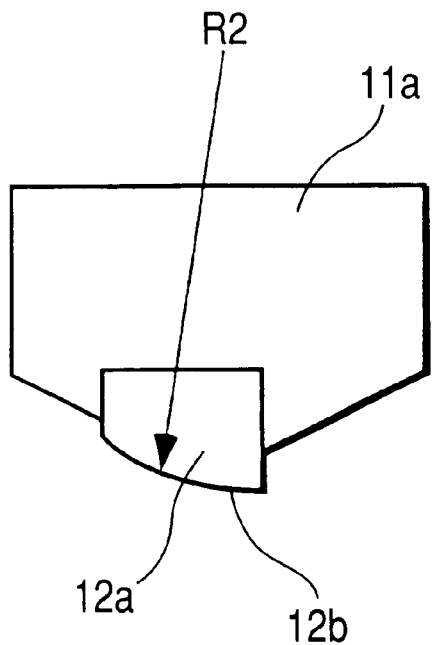
FIG. 18A is a front view showing a cutting tool used for the fabrication of a transfer master pattern for the formation of a half moon-shaped microlens.
Figure 18B:
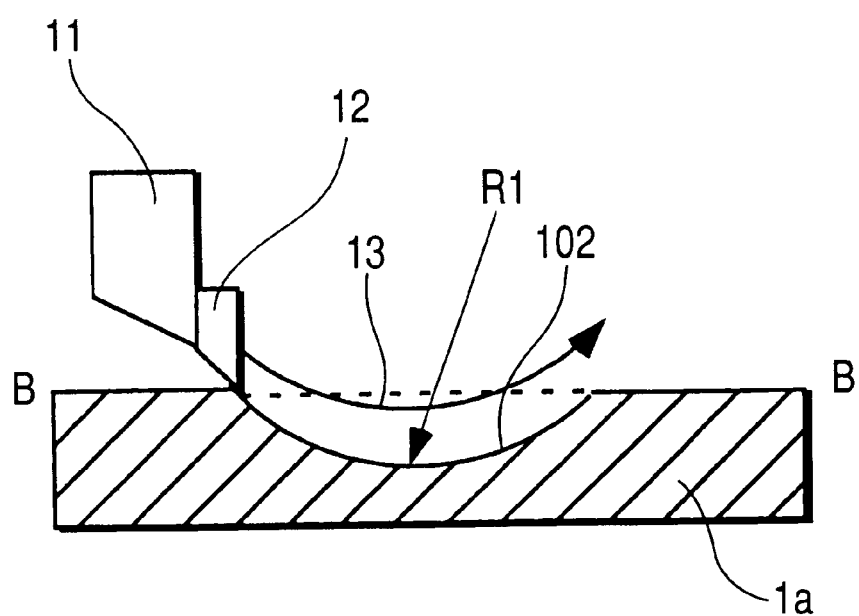
FIG. 18B is a side section of the cutting tool and a transfer master pattern.

FIG. 18A is a front view of a cutting tool used to make a transfer master pattern for the formation of a half moon-shaped microlens, and FIG. 18B is a sectional side view of the cutting tool and the transfer master pattern. In the figures, reference numeral 11a indicates a cutting tool, and reference numeral 12a indicates a half moon-shaped diamond chip. The nose profile 12b at the tip of the cutting tool 12a has a sectional form along one direction in case where the lens face 102 of a microlens is formed. That is, such a sectional form selected from those sectional forms of the lens face 102 shown in FIG. 17 is so shaped as to provide the radius R1 as expressed as a curve at the side of the A—A section. A tool moving locus 13 is so controlled on a processing device, not shown, that the cutting tool 11a of FIG. 18 is moved along the locus of the radius R1 relative to a material, in which the transfer master pattern is formed, i.e. a substrate 1a, with which when the lens face is cut once, a microlens can be formed.

The tool moving locus 13 of the cutting tool 11a is transferred to the lens face 102 to provide the A—A sectional form of the microlens configuration shown in FIG. 17B, and the nose profile 12b of the diamond chip 12a results in the B—B sectional form of the microlens configuration shown in FIG. 17C.

With respect to the tool moving locus 13, a commercially available super precision processing machine is used, and the cutting tool 11a and the transfer master pattern 1 are, respectively, attached to a drive shaft of the processing machine, followed by relatively moving the cutting tool 11a and the transfer master pattern to obtain a processed transfer master pattern 1.

Figure 19A:
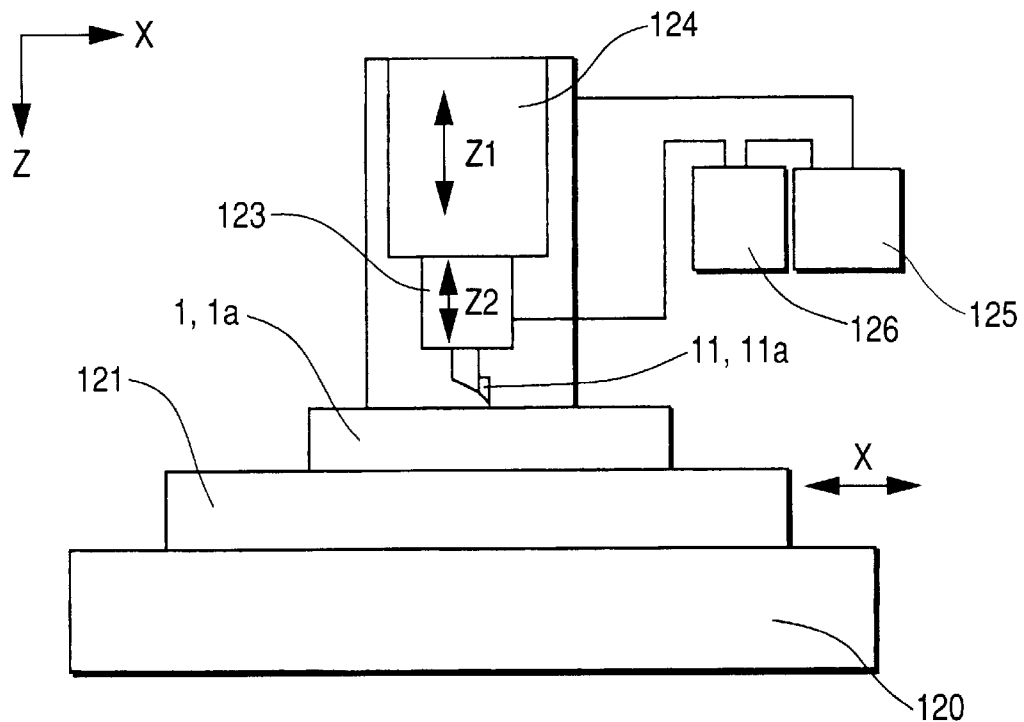
FIG. 19A is a front view of a processing device used to form a microlens.
Figure 19B:
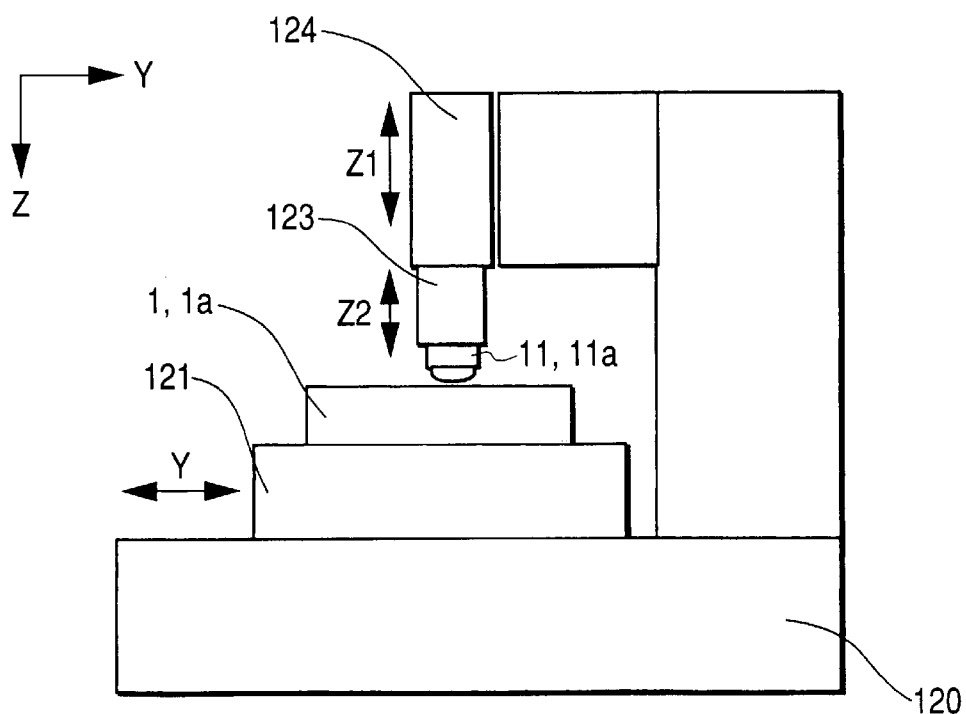
FIG. 19B is a side view showing the processing device.
Figure 20:
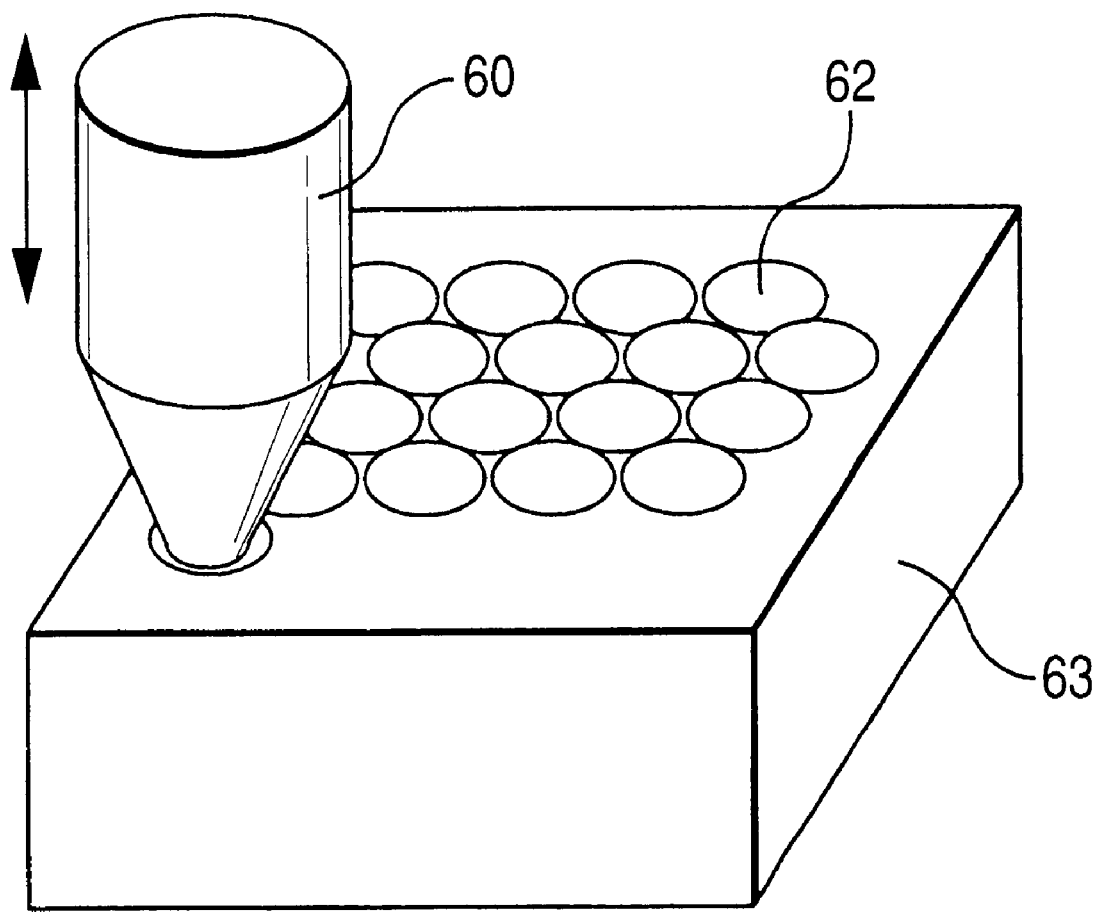
FIG. 20 is a perspective view of an indentation tool and an indentation matrix showing a method of forming a microlens according to an indentation system.

FIG. 19A is a front view of a processing apparatus for forming a microlens, and FIG. 19B is a side view showing the processing apparatus. In the figures, reference numeral 120 indicates a apparatus base, reference numeral 121 indicates a working or processing table movable in X and Y directions, reference numeral 124 indicates a Z axis drive unit movable in Z direction, and reference numeral 123 indicates a fine drive mechanism for fine movement using a piezoelectric element. The cutting tool 11 is attached to the fine drive mechanism 123, and the transfer master pattern 1 is attached to the processing table 121. Reference numeral 125 indicates an NC control unit of the processing apparatus, and reference numeral 126 indicates a control unit of the fine drive mechanism. Initially, the fine drive mechanism 123 is moved in the direction of the Z axis by use of the Z axis drive unit 124 of the processing apparatus so that the cutting tools 11, 11a and the transfer master pattern come close to each other to a given extent that they are able to be processed. Next, the transfer master pattern 1 is moved at a given speed by driving the processing table 121 toward the direction of X. At this stage, the cutting tool 11 is subjected to reciprocal movement in the direction of Z by a given small degree by means of the fine drive mechanism 123. In this manner, the tip portion of the cutting tool 11 can be moved relative to the transfer master pattern 1 in such a way as to draw the tool moving locus shown in FIG. 2B or FIG. 18B. Since a piezoelectric element is used in the fine drive mechanism 123, the formation of a plurality of microlenses in the transfer master pattern 1 is possible within a short time. It will be noted that, in this example, the piezoelectric element is used as a drive source of the fine drive mechanism 123, the drive source is not limited to a specific one in the practice of the invention. Any type of drive source may be used so far as it can finely drive the cutting tool 11 or 11a. For instance, a magnetostrictive element, a ultrasonic wave oscillator or the like may be used.

The microlens configuration of this example has such sectional forms having radii R1, R2 at the two lines passing through the center of the lens face 2 and intersecting at right angles with each other, respectively, a highly precise microlens configuration can be actually obtained according to the above processing system.

Figure 3A:
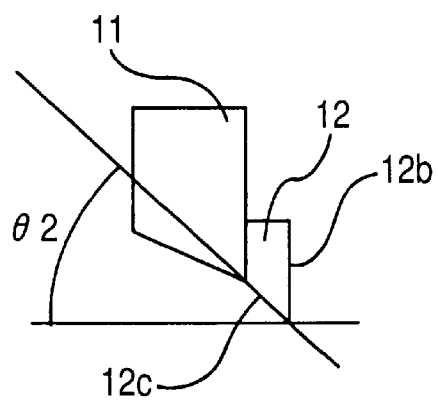
FIG. 3A is a side view showing a tooth face of a diamond tip standing vertical to a transfer master pattern for illustrating the relation between the tooth face of the cutting tool and the transfer master pattern.
Figure 3B:
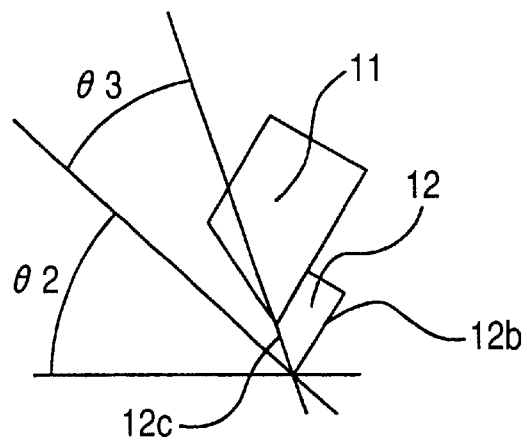
FIG. 3B is a side view showing the tooth face of the diamond chip further inclined relative to the transfer master pattern.
Figure 3C:
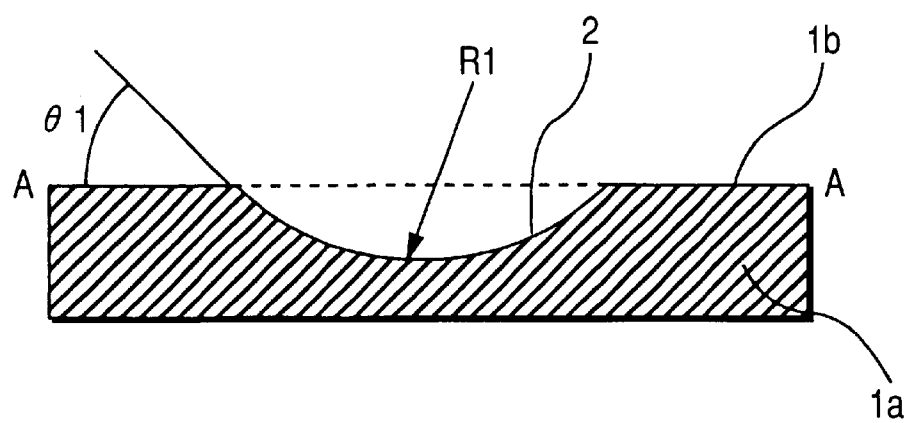
FIG. 3C is a sectional view of the transfer master pattern showing a tangential angle of a lens surface.

FIG. 3A is a side view showing the case where the tooth face of a diamond tip stands vertical to a transfer master pattern for illustrating the relation of the tooth face of a cutting toll to the transfer master pattern, FIG. 3B is a side view showing the case where the tooth face of the diamond chip is further inclined relative to the transfer master pattern, and FIG. 3C is a sectional view of the transfer master pattern showing a tangential angel of a lens face. Although the cutting tool shown in FIG. 2A and the cutting tool 11a shown in FIG. 18A maybe used as the cutting tool of this example, respectively, illustration is made hereinafter using the cutting tool 11 as the tool of this example. As shown in FIG. 3A, where a tooth face 12b of a diamond tip 12 of a cutting tool 11 stands vertical relative to a horizontal face 1b, the angle of the edge is taken as θ2. In contrast, FIG. 3B shows such a state that the cutting tool 11 is further inclined by θ3. Moreover, as shown in FIG. 3C, a tangential angle at a portion where the lens face 2 intersects with the horizontal face b of the transfer master pattern 1 is taken as θ1.

In this example, the tangential angle θ1 of a microlens configuration is defined at 23 degrees or below. This value is one that is defined in view of the relation with the edge angle θ2 of the diamond tip of the cutting tool 11 when the lens face 2 is formed. The reason for this is set out below.

Taking the crystal orientation of a material and the life for use as a tool into account, the diamond tip should have a value of θ2 at 20 degrees or below. Upon processing, the tool 11 can be used is in such a way as to be turned in a cutting direction and inclined by θ3. In this connection, however, with respect to the magnitude of θ3, appropriate cutting conditions include those conditions of minus 3 degrees to plus 3 degrees. In this way, the tool 11 used for the processing can be inclined by θ2+θ3 relative to the horizontal face, and this angle is at 23 degrees. Where it is required that the inclination of the transfer master pattern 1 relative to the horizontal face 1b be at a tangential angle of θ2+θ3 or over, the configuration of the lens face 2 is deformed through contact with a rear portion 12c behind the edge 12a of the diamond tip, so that the tangential angle θ1 is defined at 23 degrees or below. The diameter of the lens face 2 should preferably be at 30% or below of the radius of the nose or edge profile of the diamond tip. The reason for this is that the microlens configuration of this example differs in shape from the a conventional, axially symmetrical microlens face that is axially symmetric with respect to the central axis and also differs in optical characteristics, for which a geometric difference has to be lessened.

Figure 4:
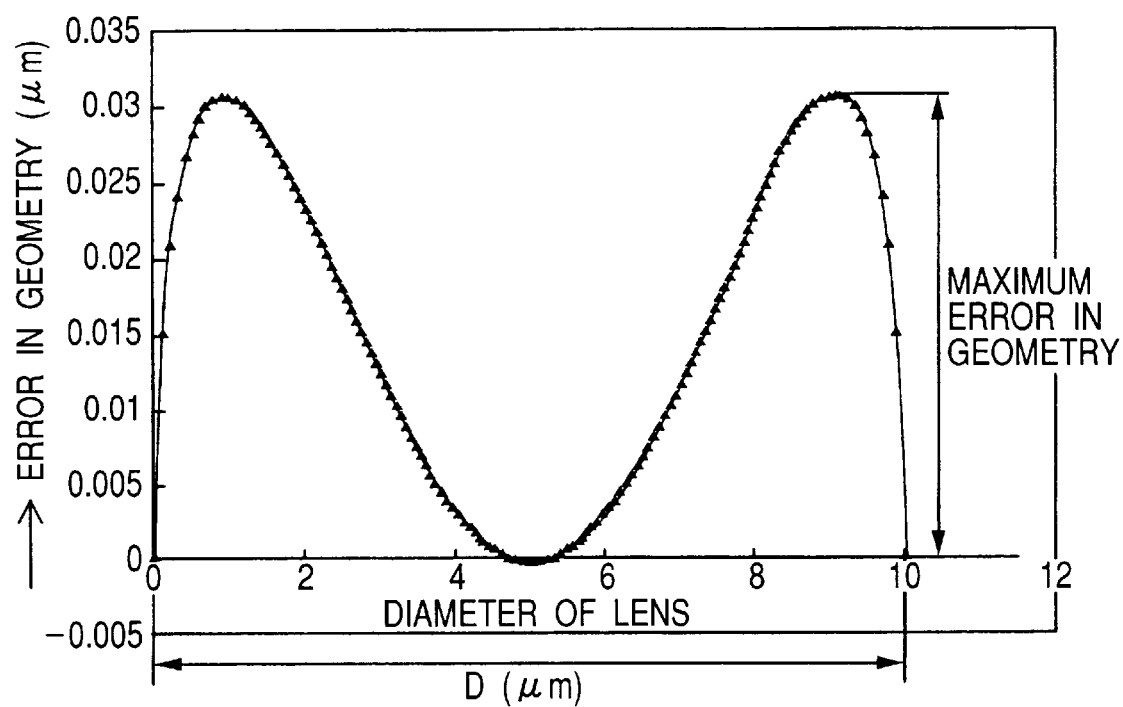
FIG. 4 is a characteristic curve showing a geometric error of a microlens configuration formed according to an example for a spherical shape.

FIG. 4 is a characteristic curve showing an error in the spherical microlens geometry formed in this example, in which an abscissa indicates a diameter ($\mu$m) of a microlens configuration and an ordinate indicates a geometric error ($\mu$m) With respect to the difference in sectional form between the sphere-shaped microlens and the lens face 2 of the microlens of this example, the results of calculation of a geometric error based on the sphere-shaped lens face as a reference are shown. For the calculation, the radius R1 corresponding to that along the cutting direction of the lens face 2 is set at 20 $\mu$m and the diameter of the lens face 2 is set at 10 $\mu$m. In this case the geometric error is at 0.03 $\mu$m or below, which is well within a processing error in the conventional processing system. Accordingly, the application of the microlens configuration to an lens array designed as a spherical face is considered as effective. Nevertheless, because the geometric error increases when a ratio of the diameter D of the lens face and the radius R2 of the nose profile 12a of the diamond tip 12, i.e. D/R2, is at 0.73 or over, a limitation is placed on the applications alone which can allow the geometric error.

Figure 5:
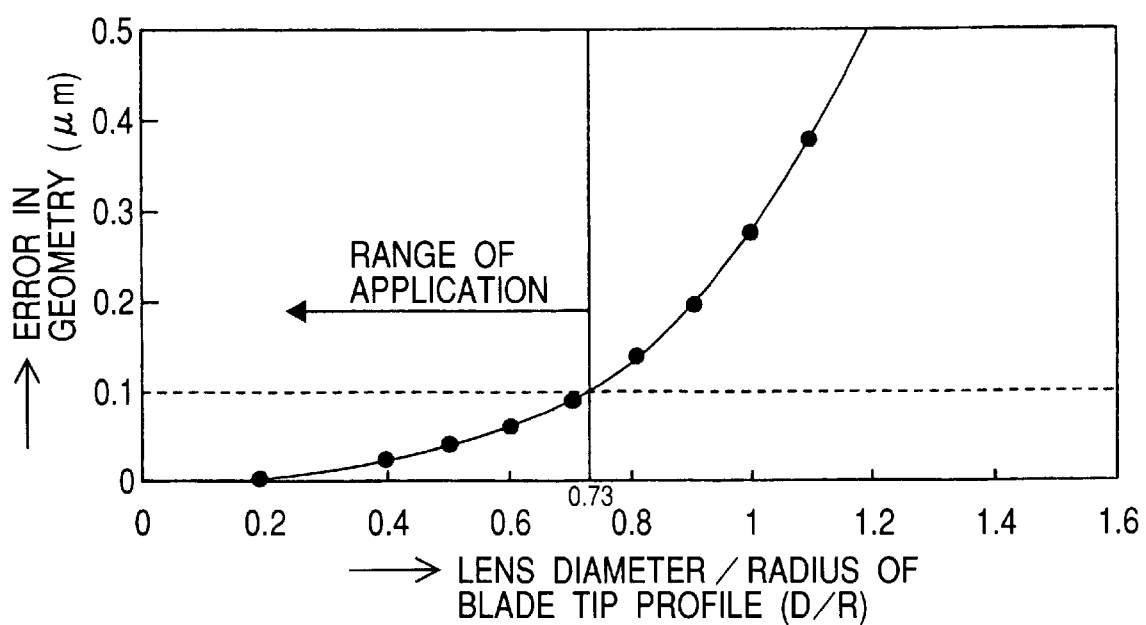
FIG. 5 is a characteristic curve showing a maximum error in geometry.

FIG. 5 is a characteristic curve showing the maximum geometric error, in which an abscissa indicate a ratio D and R (D/R) wherein D is a lens diameter and R is a radius showing a nose profile of a diamond tip, and an ordinate indicates a maximum error ($\mu$m). As shown in the figure, when the ratio of D to R wherein D is the lens diameter (which is an instance of D1=D2 in FIG. 1) and R is a radius ensuring the formation of the nose profile of the diamond tip 12, the maximum error tends to increases. According to the experiment made by us, the characteristic degradation of a microlens starts to occur appreciably when the maximum error is 0.1 ($\mu$m) or over. Accordingly, the maximum error should preferably be at a level of 0.1 $\mu$m or below.

Where the maximum error is at 0.1, the value of D/R is at 0.73. In this sense, the value of D/R should preferably be 0.73 or below. If the value of D/R is 0.2 or below, this is within a range where the formation of a microlens is difficult.

Figure 6:
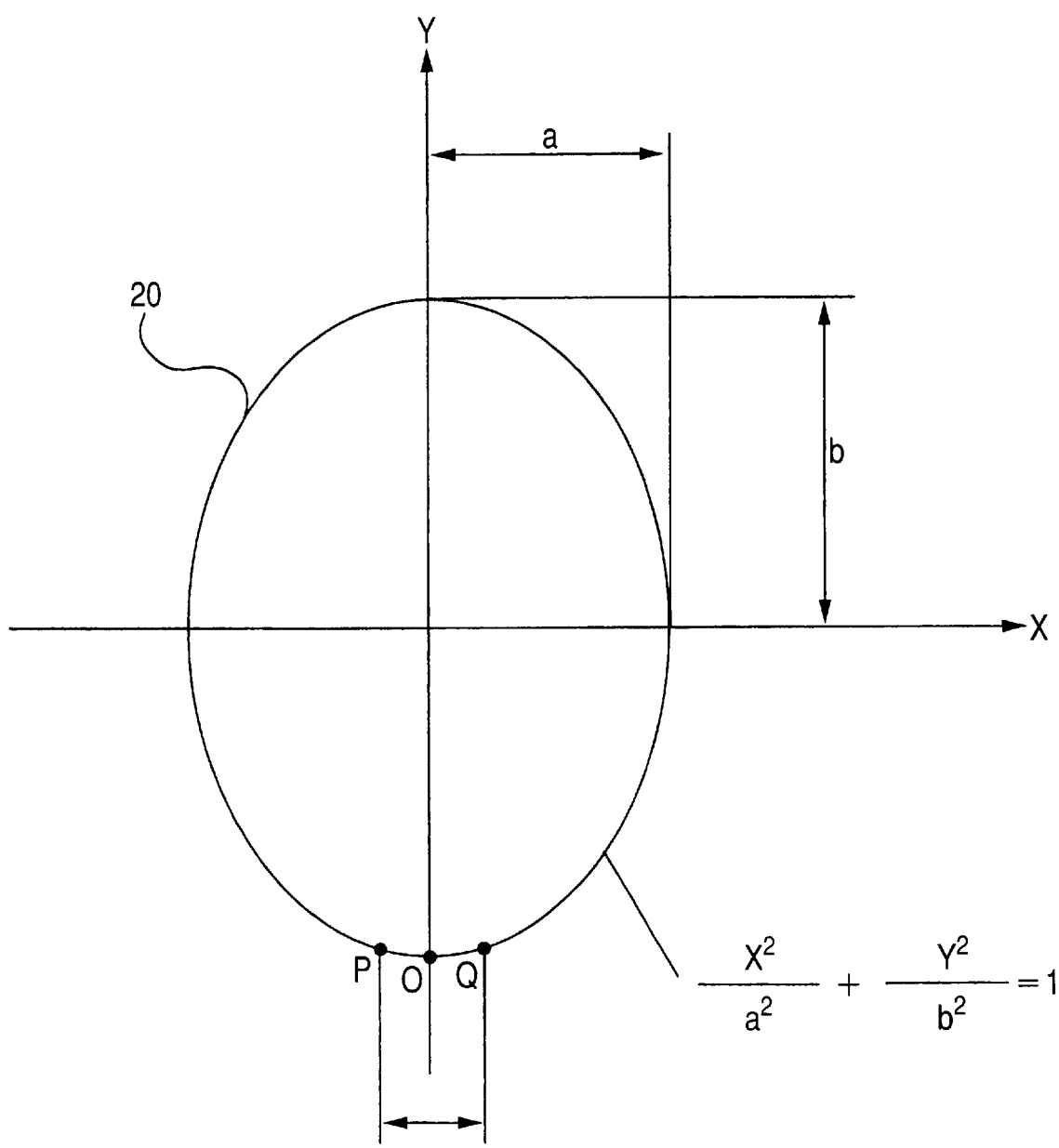
FIG. 6 is an elliptic curve for illustrating another example of the microlens formed according to the invention.

Reference is now made to a second example of this invention wherein the A—A sectional form and B—B sectional form in FIGS. 1B and 1C and FIGS. 17B and 17C are not in a circular or spherical form, but in an aspherical form. In this example, a part of an elliptic curve 20 (FIG. 6), i.e. a curve POQ, is used to provide an aspheric form. The use of the aspheric form is able to improve the freedom of design of optical characteristics. Thus, a lens array having a more excellent light utilization efficiency can be formed. The microlens configuration of the invention is so formed that the sections passing through an X central line 3 and a Y central line 4 are in desired aspheric forms, respectively. It occurs that the curve POQ that is part of the elliptic curve 20 shown in FIG. 6 is taken as the aspheric form. When the parameters a, b of the major axis and the minor axis of the elliptic curve 20 are set, a curve can be determined accordingly. When using the same curve as the X central line 3 and the Y central line 4 of the elliptic curve, a substantially circular microlens can be formed.

In this example, the curve used to from a microlens is not limited to the elliptic curve, but a quadratic curve or a higher-order curve may be used for this purpose.

Figure 7:
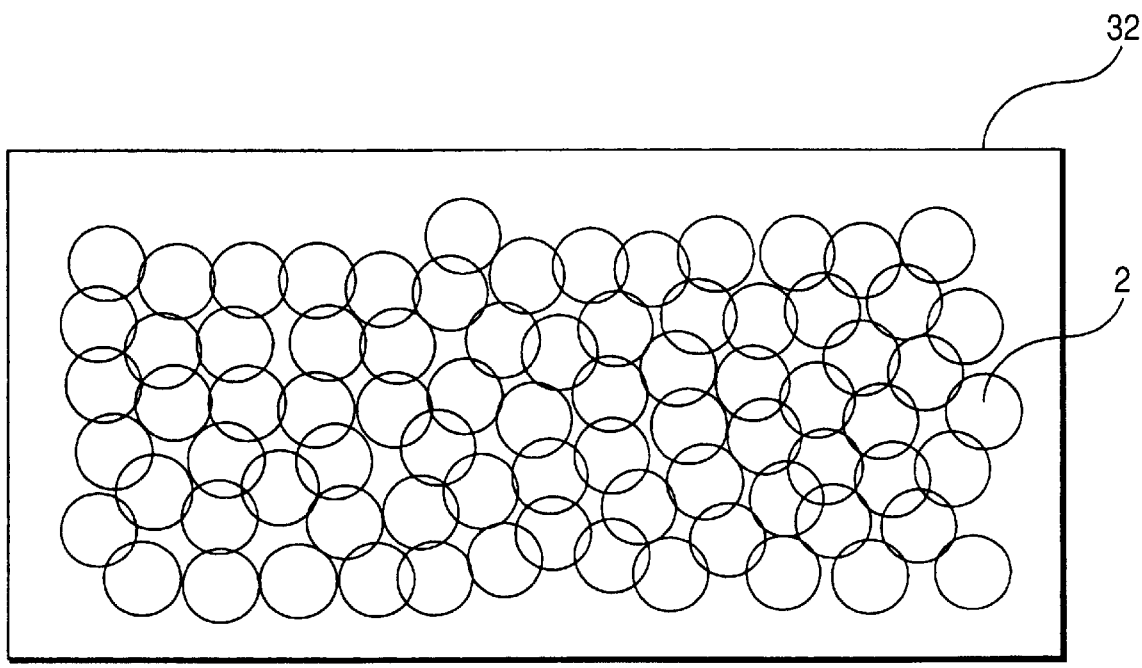
FIG. 7 is a front view showing an example of a reflector plate constituted by arranging a plurality of microlens configurations according to the invention.

FIG. 7 is a front view showing an example of a reflector plate which is constituted by arranging a plurality of microlens configurations according to the invention. In order to reflect white light without involving iridescence in reflected light relative to incident light from outside, the microlens configuration are arranged at uneven pitches. With the formation or fabrication of microlenses by use of an indentation processing system, when a microlens is formed in the vicinity of or at a position in contact with a previously formed microlens, plastic flow occurs owing to the conflict between both the microlenses or the jamming thereof in a narrow area, so that the shapes of the microlenses change, and thus, desired properties may not be obtained. When using the microlens 2 formed according to the invention, microlens configurations of high accuracy can be processed at uneven pitches according to the cutting system, thus making it possible to form a reflector plate in a high efficiency.

It has been experimentally confirmed that where the reflector plate 32 is made by forming microlenses at uneven pitches on a plane, it is favorable to arrange microlenses at a pitch between adjacent microlens configurations within a range of 50 to 100% based on the lens radius.

Figure 8A:
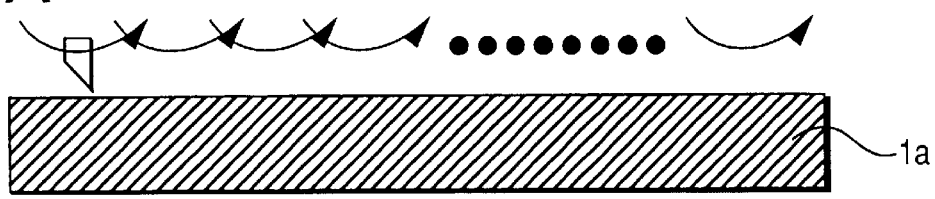
FIGS. 8A to 8F are, respectively, sectional views showing an example of a processing procedure for making a reflector plate according to the invention.
Figure 8B:
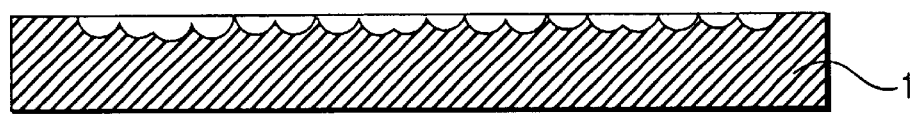
Figure 8C:
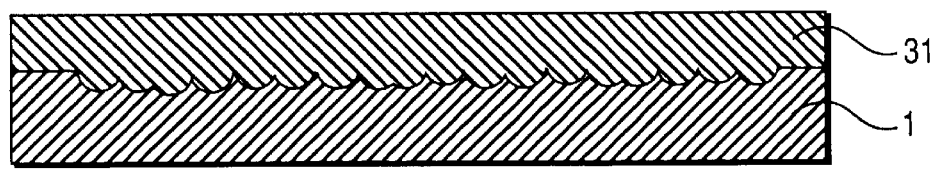
Figure 8D:
Figure 8E:
Figure 8F:

FIGS. 8A to 8F are, respectively, sectional views showing an example of a processing procedure of forming a reflector plate according to the invention. FIG. 8A is a sectional view of a substrate serving as a die wherein a substrate 1a used as a transfer master pattern 1 is cut according to the cutting system shown in FIG. 2. FIG. 8B is a sectional view of the transfer master pattern after processing, showing the transfer master pattern formed with a plurality of microlens configurations therein. FIG. 8C is a sectional view of a reverse pattern for the transfer master pattern 1, showing the step of obtaining the reverse pattern (a concave and convex pattern) by applying a UV-curing resin onto the transfer master pattern. The reversal permits the concave-shaped microlens configuration to be converted to a convex configuration. FIG. 8D is a sectional view of the reverse pattern, showing a convex configuration-bearing reverse pattern (convex pattern) 31. FIG. 8E is a sectional view of the reverse pattern and a formed reflector plate, showing the step of forming the outer shape of the reverse pattern 31 in the surface of a reflector plate. FIG. 8F is a sectional form of the reflector plate having a microlens configuration pattern or array formed therein, showing the reflector plate 32 in which the microlens configuration pattern has been formed by use of the reverse pattern 31.

Figure 9:
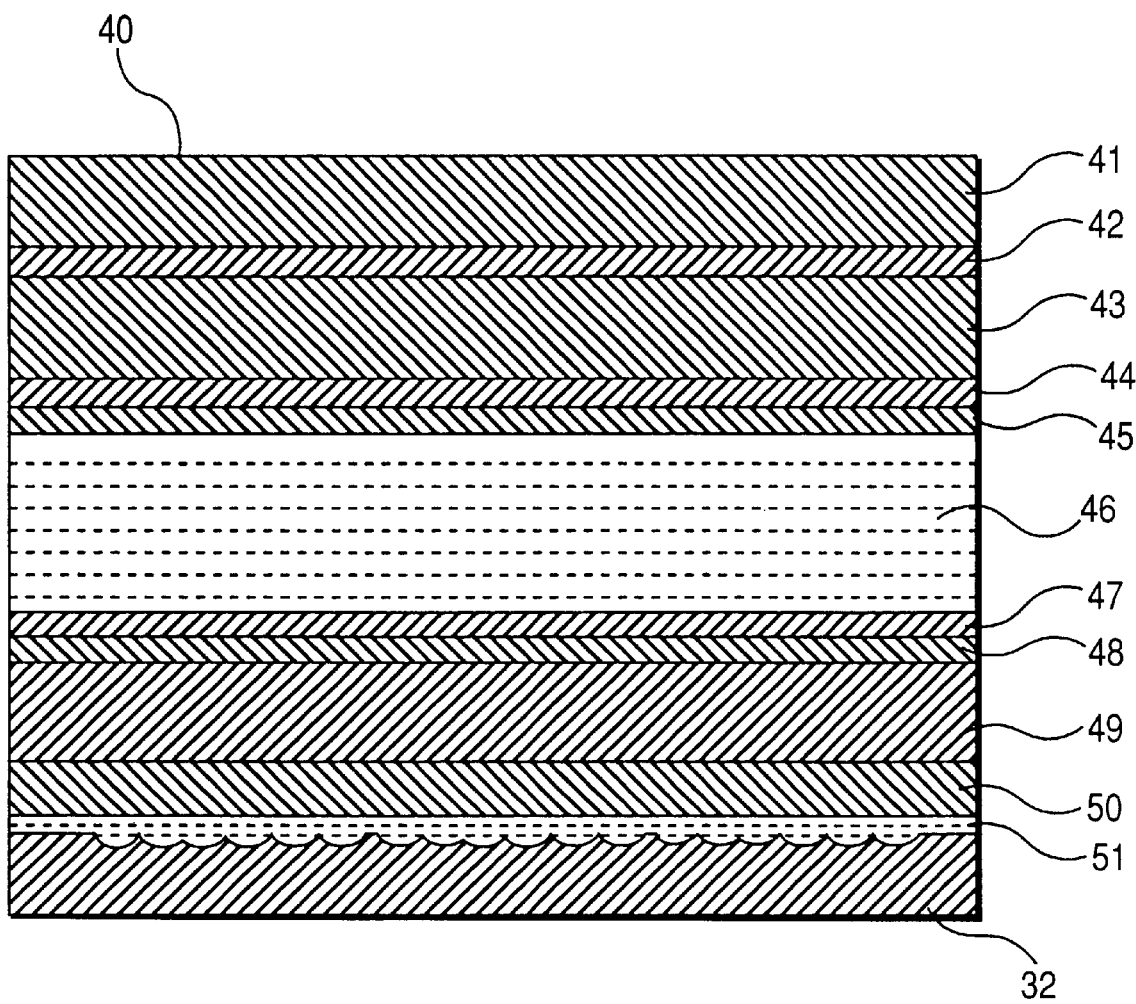
FIG. 9 is a sectional view showing an example of a reflection-type liquid crystal display device using a reflector plate according to the invention.

FIG. 9 is a sectional view showing an example of a reflection-type liquid crystal display device using the reflector plate according to the invention. In the figure, a reflection-type liquid crystal display device 40 is provided with a reflector plate 32 having lens faces 2, each serving as a microlens, formed at uneven or irregular pitches.

The reflection-type liquid crystal display device 40 of FIG. 9 has a pair of a display side glass substrate 43 and a back side glass substrate 49, each having a thickness of 0.7 mm, between which a liquid crystal layer 46 is provided. A phase difference plate 42 is provided on the upper side of the display side glass substrate 43, and a first polarizing plate 41 is further provided on the upper side of the phase difference plate 42. The back side glass substrate 49 is attached, at the lower side thereof, a second polarizing plate 50 and the reflector plate 32 of the invention. The reflector plate 32 is so attached to the lower side of the second polarizing plate 50 that the lens faces of the reflector plate 32, which has the microlens faces 2 at uneven pitches, are in face-to-face relation with the lower side. For the attachment, a self-adhesive body 51 made of a material that does not adversely influence the refractive index of light is filled between the second polarizing plate 50 and the reflector plate 32. Transparent electrode layers 44, 48 are, respectively, formed on the facing sides of both the glass substrates 43, 49, and alignment films 45, 47 are, respectively, formed on the transparent electrode layers 44, 48. A liquid crystal in the liquid crystal layer 46 is twisted at a given angle depending on the relation between the alignment films 45, 47, and its molecular arrangement is changed by the electrolytic effect given from the transparent electrodes 44, 48 thereby ensuring the refraction control of light. If a color filter, not shown in the figure, is formed between the back side glass substrate 49 and the transparent electrode layer 48, a color liquid crystal display device can be formed.

Figure 10:
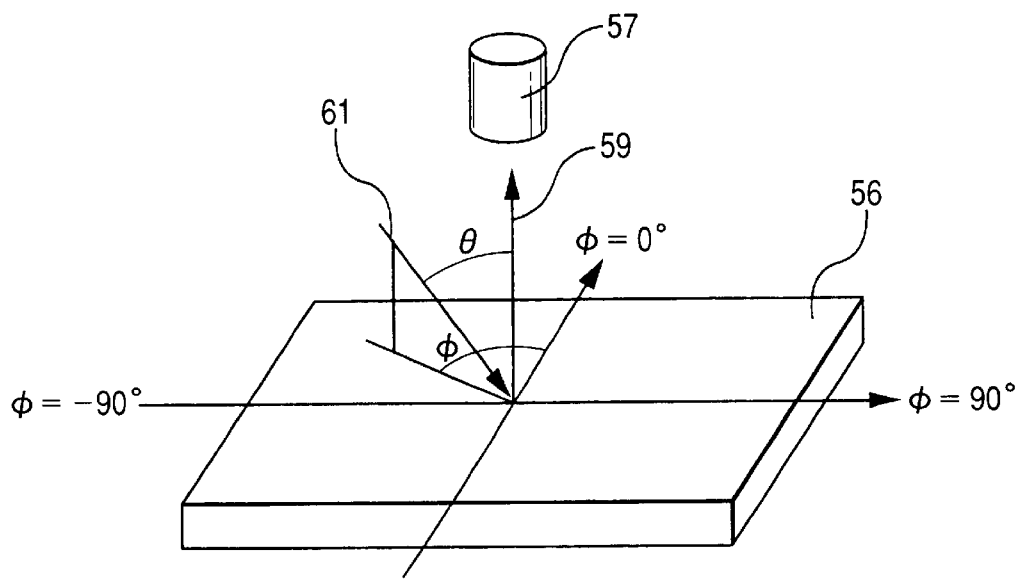
FIG. 10 is a perspective view illustrating a measuring method of reflection characteristics of a reflector plate according to the invention.

Referring now to FIG. 10, a method of measuring reflection characteristics of the reflector plate is illustrated. Using this measuring method, it is described how the reflector plate made according to the invention exhibits a more excellent effect than the reflector plate made according to other method.

FIG. 10 is a perspective view illustrating a measuring method of reflection characteristics of the reflector plate according to the invention. An incident light ray 61 is passed into a sample 56, and the resultant reflected light ray 59 is measured by means of a luminance meter 57. When an angle between the incident light ray 61 and the reflected light ray 59 is at θ and the luminance that is observed along a normal line relative to a diffuse reflector plate within a necessary range of θ, i.e. a reflection intensity, is increased, a reflector plate having excellent reflection characteristics can be obtained.

Figure 11:
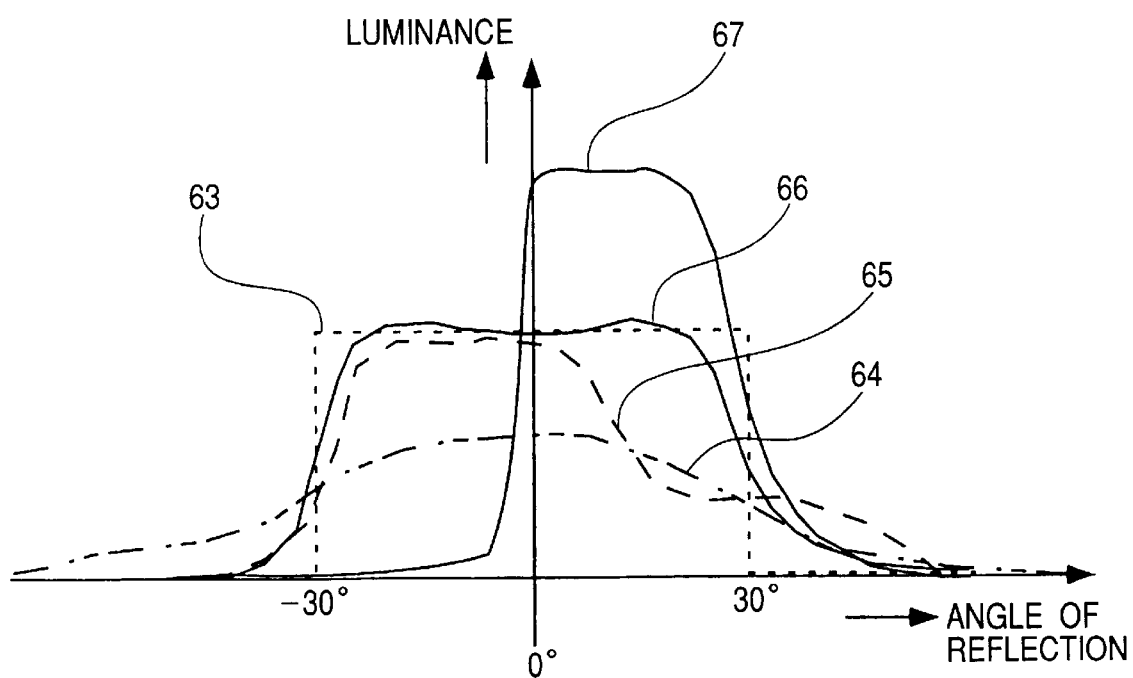
FIG. 11 is a characteristic view showing reflection characteristics.

FIG. 11 is a graph showing reflection characteristics. In the figure, reference numeral 63 indicates an ideal reflection characteristic. More particularly, when a luminance is measured while rotating a light source from 20 degrees to 30 degrees by use of the measuring apparatus of FIG. 10 and is likewise measured while rotating a sample by 180 degrees, the measurements of the luminance are same at any angles of reflection. A curve 64 shows a reflection characteristic of a reflector plate made according to a sand blasting method, revealing that a first transition gain is weak with a weak reflection luminance. A curve 65 is for the reflector plate formed according to an indentation method, revealing that anisotropy to the angle of reflection is serious. A curve 66 shows the reflection characteristic of the reflector plate made according to the invention, which is very close to the ideal reflection characteristic 63.

The reflector plate may also be obtained according to such a procedure as set forth hereinabove, but using the transfer mast pattern 1 having half moon-shaped lens faces 102 according to other embodiment of the invention. With the characteristic of the reflector plate obtained by use of the transfer master pattern having the lens faces 102, the directions of reflection can be concentrated only toward the directions of from 0° to positive angles, like the curve 67, so that while keeping a shape similar to the curve 63 that shows an ideal reflection characteristic, the luminance can be improved. Especially, the characteristic of the curve 67 enables one to control an improving direction of luminance by controlling the direction of the straight portion of the half moon-shaped lens face. Thus, the controllbility of the reflection direction is more excellent than that of the sample, obtained by the indentation system, of the curve 65 were anisotropy occurs irregularly.

As stated hereinabove, the lens face of the microlens configuration according to the invention can be formed by the cutting system stated hereinbefore, and the lens face based on design values is available. Moreover, an aspheric lens face configuration can be created, so that the resultant microlens configuration has a high degree of freedom of optical design.

Further, when using a reflector plate where microlenses are arranged at uneven pitches, a reflector plate which is excellent as having reflection characteristics based on design data or values can be obtained.

Figure 12A:
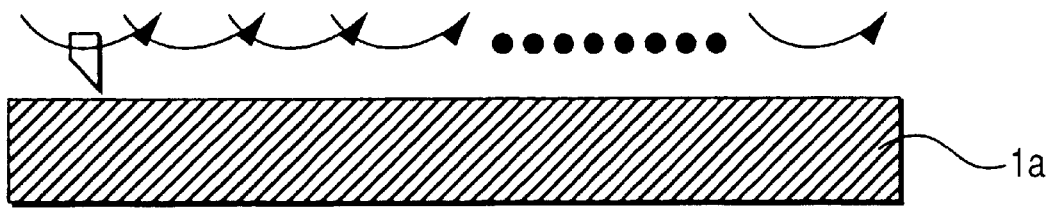
FIGS. 12A to 12D are, respectively, sectional views showing an example of a processing procedure for manufacturing a concave and convex pattern from a transfer master pattern according to the invention.
Figure 12B:
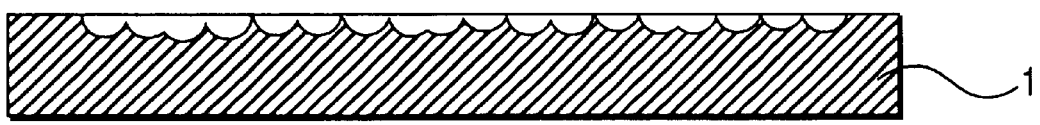
Figure 12C:
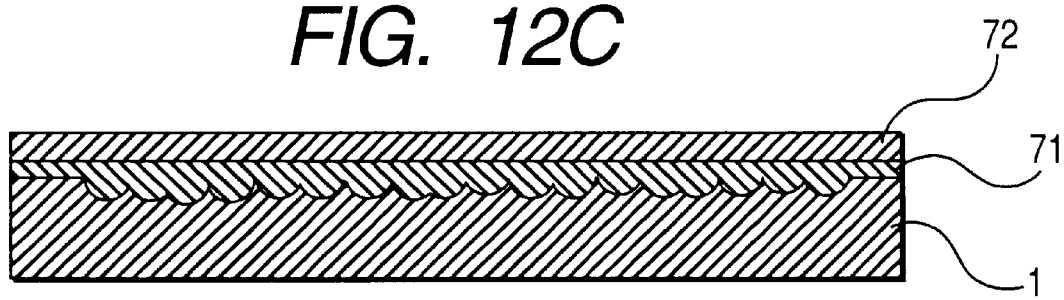
Figure 12D:
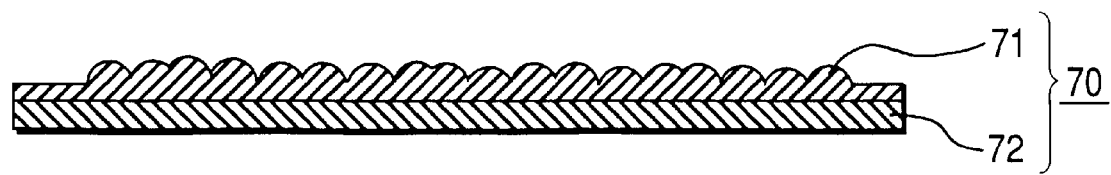

FIGS. 12A to 12D are, respectively, sectional views showing an example of a processing procedure of making a concave and convex pattern from a transfer master pattern according to the invention. FIG. 12A is a sectional view of a substrate, wherein a substrate 1a is cut according to the cutting system shown in FIG. 2. FIG. 12B is a sectional view of a transfer master pattern, which is made by cutting the substrate 1a. FIG. 12C is a sectional view showing the transfer master pattern, a support for a transferred substrate and a substrate to be transferred, which is formed on the support, wherein a substrate 71 to be transferred, which is provided on a support for a transferred substrate, is pressed against the concave portions of the transfer master pattern 1. FIG. 12D is a sectional view of the substrate 71 and the support for the transferred substrate, each having a concave and convex pattern formed therein, wherein the substrate 71 and the support for supporting the substrate 71 are separated from the transfer master pattern 1 to provide a concave and convex pattern 70. The microlens configurations formed on the concave-shaped transfer master pattern 1 by reverse formation are, respectively, convex as shown in FIG. 12D. In this manner, the concave and convex pattern can be made by holding a deformable substrate to be transferred against the transfer master pattern 1. The substrate 71 to be transferred should be made of a plastic film which is deformable, and the deformable substrate 71 is provided on the support 72 for a transferred substrate. (The substrate 71 to be transferred may be cured after deformation, if necessary.) Heat, light or the like may be applied to the substrate 71 in the course of the holding step. The concave and convex pattern 70 should preferably be in the form of a film.

Figure 13:
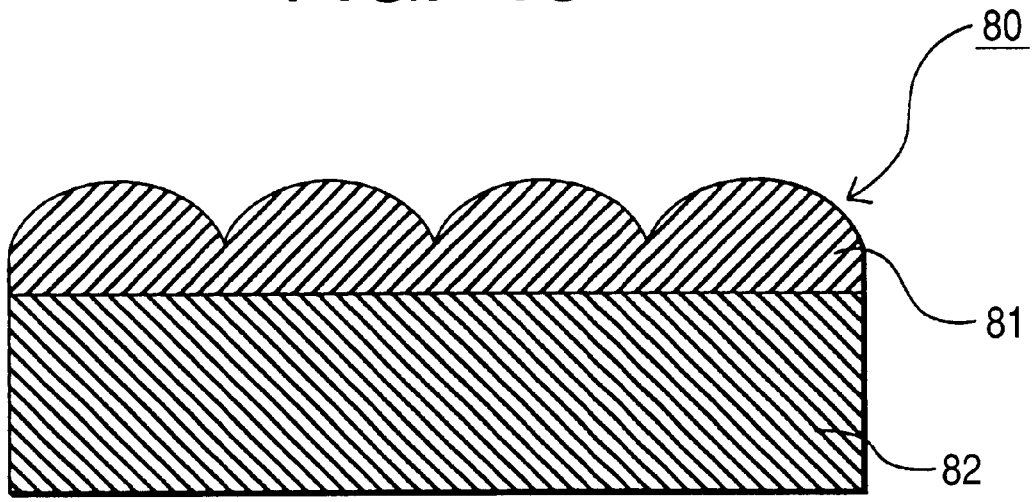
FIG. 13 is a sectional view showing an example of a concave and convex film according to the invention.

FIG. 13 is a sectional view showing an example of a concave and convex pattern-bearing film according to the invention and shows a concave and convex pattern-bearing film 80 made according to the method illustrated with reference to FIG. 12. The concave and convex pattern-bearing film of FIG. 13 has a concave and convex pattern-transferred underlying layer 81 built up on a base film (or a substrate) 82.

The base film 82 used in the invention is deformable and should preferably be chemically and thermally stable. Specific examples of materials for the base film 82 include polyolefins such as polyethylene, polypropylene and the like, polyvinyl halides such as polyvinyl chloride, polyvinylidene chloride and the like, cellulose derivatives such as cellulose acetate, nitro cellulose, cellophane and the like, polyamides, polystyrene, polycarbonates, polyimides, polyesters, or metals such as aluminium, copper and the like. Of these, a biaxially oriented polyethylene terephthalate film having excellent dimensional stability is preferred.

After the formation of the concave and convex pattern, the underlying layer 81 should preferably be harder than a thin film layer described hereinafter. For instance, there is used at least one organic polymer selected from polyolefins such as polyethylene, polypropylene and the like, ethylene copolymers such as ethylene-vinyl acetate copolymer, ethylene acrylic ester copolymers, ethylene vinyl alcohol copolymer and the like, polyvinyl chloride, vinyl chloride-vinyl acetate copolymer, vinyl chloride-vinyl alcohol copolymer, polyvinylidene chloride, polystyrene, styrene copolymers such as styrene-(meth)acrylic ester copolymers, polyvinyl toluene, vinyl toluene copolymers such as vinyl toluene-(meth)acrylic ester copolymers, poly(meth)acrylic esters, (meth)acrylic ester copolymers such as vinyl(meth) acrylate-vinyl acetate copolymer, cellulose derivatives such as cellulose acetate, nitro cellulose, cellophane and the like, polyamides, polystyrene, polycarbonates, polyimides polyesters, synthetic rubbers, and the like.

For the formation of the underlying layer 81, a photoinitiator or a monomer having an ethylenical double bond may be added beforehand, if necessary, in order to cure after the formation of the concave and convex pattern. The photosensitive type may be either a negative or positive type.

The manner of coating the underlying layer 81 used in the invention includes coating by a roll coater, coating by a spin coater, spray coating, whaler coating, coating by a dip coater, coating by a curtain flow coater, coating by a wire bar coater, coating by a gravure coater, coating by an air knife coater, and the like.

Figure 14A:
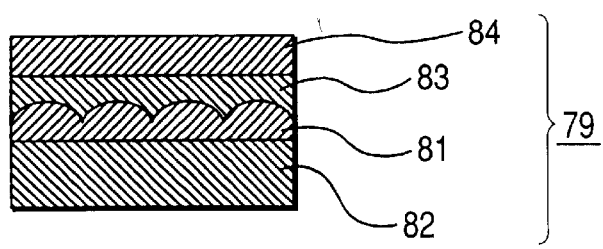
FIGS. 14A to 14E are, respectively, side view, partially in section, which illustrates a method for manufacturing a diffuse reflector plate using a transfer laminate.

FIGS. 14A to 14E are, respectively, side views, partially in section, for illustrating a method of making a diffuse reflector plate using a transfer laminated body, with its detail being described hereinafter. FIG. 14A is a side view, partially in section, showing an example of a laminate for transfer according to the invention. In FIG. 14A, the concave and convex pattern-transferred underlying layer 81 is built up on the base film 82, on which a thin film layer 83 and a cover film 84 are further formed to provide a laminate 79 for transfer. For the laminate 79, the cover film 84 may be omitted.

The thin film layer 83 of the laminate 79 may be made of a deformable organic polymer, a composition comprising the polymer, an inorganic compound, a metal or the like. Preferably, an organic polymer or its composition that is capable of being applied onto a support and taken up in the form of a film roll. If a composition comprising an organic polymer is used, dyes, organic pigments, inorganic pigments, powders and composite material thereof may be contained singly or in combination, if necessary. As the thin film layer 83, a photosensitive resin composition or a thermosetting resin composition may be used. The thin film layer 83 is not critical with respect to the dielectric constant, hardness, refractive index, and spectral transmittance thereof. The thin film layer 83 should preferably be made of a material, which has good adhesion to a substrate, i.e. a liquid crystal panel 85 such as, for example, a glass substrate and is likely to peel off from the underlying layer 81 (if a plastic film having no underlying layer 81 is used, the material should have a good property of peeling off from the plastic film).

The material for the thin film layer 83 includes, for example, an acrylic resin, a polyolefin such as polyethylene, polypropylene or the like, a polyvinyl halide such as polyvinyl chloride, polyvinylidene chloride, a cellulose derivative such as cellulose acetate, nitro cellulose, cellophane or the like, a polyamide, polystyrene, a polycarbonate, a polyimide, a polyester or the like. Those material shaving photosensitivity may also be used. In some case, a photosensitive resin, which can be developed with an alkali or the like so that unnecessary portions are removed while leaving only portions where concave and convex forms are necessary, maybe used. In order to improve heat and solvent resistances and shape retention, a resin composition that is curable by application of heat or light after the formation of a concave and convex pattern may also be sued. Moreover, if a coupling agent and an adhesion-imparting agent are added, adhesion to a substrate can be improved. For the purpose of improving adhesion, an adhesion-imparting agent may be applied onto an adhesion surface of a substrate or the thin film layer 83.

The resins capable of being developed with an alkali should preferably ones having an acid value of 20 to 300 and a weight average molecular weight of 1,500 to 200,000.

Preferred examples include copolymers of styrene-based monomers and maleic acid and derivatives thereof (hereinafter referred to as SM polymer or copolymer), and copolymers of unsaturated monomers having a carboxyl group such as acrylic acid, methacrylic acid and the like and styrene monomer, alkyl methacrylates such as methyl methacrylate, t-butyl methacrylate, hydroxyethyl methacrylate and the like and alkyl acrylates having similar alkyl groups as mentioned above.

The SM copolymers include those obtained by copolymerizing styrene or derivatives thereof (i.e. styrene-based monomers) such as styrene, α-metylstyrene, m or p-methoxystyrene, p-methylstyrene, p-hydroxystyrene, 3-hydroxymethyl-4-hydroxystyrene and the like, and malic anhydride, maleic or maleic acid derivatives such as monomethyl maleate, monoethyl maleate, mono-n-propyl maleate, mono-iso-propyl maleate, n-butyl maleate, mono-iso-butyl maleate, mono-tert-butyl maleate and the like (and these copolymers are hereinafter referred to as copolymer (I)). The copolymer (I) includes one which is obtained by modification thereof with a reactive double bond-bearing compound (copolymer (II)).

The copolymer (II) can be prepared by reaction of the acid anhydride group or carboxyl group in the copolymer (I), for example, with an unsaturated alcohol such as allyl alcohol, furfuryl alcohol, oleyl alcohol, cinnamyl alcohol, 2-hydroxyethyl acrylate, hydroxyethyl methacrylate, N-methylol acrylamide or the like, or an epoxy compound having one oxysilane ring and one reactive double bond, respectively, such as glycidyl acrylate, glycidyl methacrylate, allyl glycidyl ether, α-ethylglycidyl acrylate, monoalkylmonoglycidyl itaconate or the like. In this connection, however, it is essential that a carboxyl group necessary for carrying out an alkali development be left in the copolymer. The modification of carboxyl group-bearing polymers other than the SM polymers with such a reactive double bond as mentioned above is preferred from the standpoint of photosensitivity. These copolymers can be prepared according to the methods set forth such as in Japanese Examined Patent Publication Nos. Sho 47-25470, Sho 48-85679 and Sho 51-21572, and the like. The formation of the thin film layer 83 in such a thickness as to be larger than a peak-to-valley height in the concave and convex configurations of the underlying layer 81 ensures easy reproduction of the concave and convex configurations. If the thickness is similar to the height, the concave and convex configurations are deformed. In addition, the formation of the concave and convex configurations may present such a problem as described hereinafter.

The coating method of the thin film layer is similar to the coating method of the underlying layer 81 and includes coating by a roll coater, coating by a spin coater, spray coating, whaler coating, coating by a dip coater, coating by a curtain flow coater, coating by a wire bar coater, coating by a gravure coater, coating by an air knife coater or the like.

The cover film for the transfer laminate 79 should preferably be chemically and thermally stable, and easily peelable from the thin film layer 83. Specific and preferred examples include thin sheets of polyethylene, polypropylene, polyethylene terephthalate, polyvinyl alcohol and the like, which have smooth surfaces. In order to impart good peeling properties, those sheets subjected to release treatment on the surface thereof are included within the scope of the invention.

Next, with reference to FIGS. 14A to 14E, a method of making a diffuse reflector plate is described.

Figure 14B:
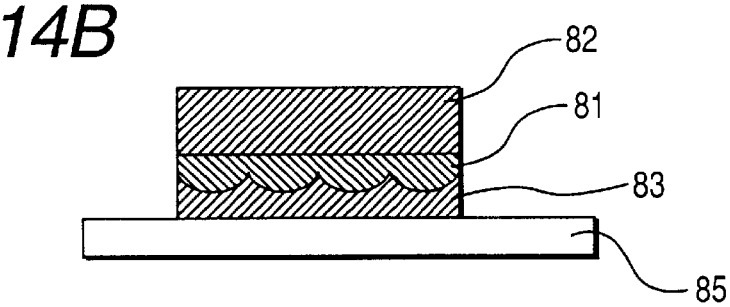
Figure 14C:
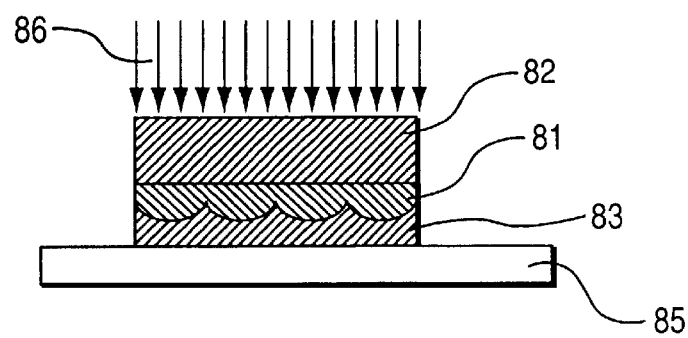

FIGS. 14A to 14E are, respectively, side views, partially in section, for illustrating a method of making a diffuse reflector plate using the transfer laminate. FIG. 14A is a sectional view showing an example of a transfer laminate according to the invention. FIG. 14B shows the case where a thin film layer 83 is bonded to a substrate 85 after separation of a cover film 84 from the transfer laminate 79 shown in FIG. 14A. In other words, FIG. 14B is a side view, partially in section, of the case where the transfer laminate is in intimate contact with a liquid crystal panel. As shown in this figure, the exposed surface of the thin film layer 83 is held against an application substrate 85 such as a glass substrate, i.e. a liquid crystal panel. For satisfactory and uniform pressing, it is preferred to use hot pressing with hot pressing rubber rolls. However, heating is not always necessary. FIG. 14C is a side view, partially in section, of the case where a photosensitive resin used as the thin film layer in FIG. 14B. Where a photosensitive resin is used as the thin film layer 83, it is preferred to irradiate actinic light such as UV light for using as shown in FIG. 14C. By the irradiation, while adhering satisfactorily to the glass substrate, it becomes possible to satisfactorily keep the concave and convex forms and permit the underlying layer 81 to be readily peeled off from the thin film layer 83. It should be noted that in this example, the step of FIG. 14C is not necessarily required.

Figure 14D:
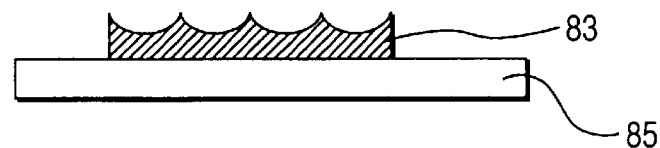

FIG. 14D is a side view, partially in section, of the case where a base film and the underlying layer are separated from the laminate of FIG. 14B. As shown in the figure, the separation of the underlying layer 81 and the thin film layer 83 (including the removal of the base film 82 as a matter of course) results in the laminate the concave and convex configuration-bearing thin film layer 83 on the application substrate 85.

Figure 14E:
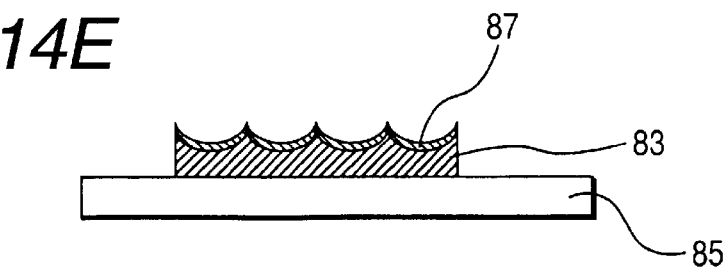

Further, FIG. 14E is a side view, partially in section, of the case where a reflective film layer is provided on the applied substrate. As shown in the figure, a reflective film layer 87 is formed on the thin film layer 83 to make a diffuse reflector plate.

The type of material for the reflective film layer 87 is properly selected depending on the reflection region where reflection is intended. For instance, with a reflection LCD display device, a metal that exhibits high reflectivity within avisible light region of 300 nm to 800 nm, e.g. aluminium, gold, silver or the like, is formed as a film by a vacuum deposition method or a sputtering method. A reflection-increasing film (as set forth in Kougaku Gairon (Outlines of Optics) 2 (written by Jyunpei Tsujiuchi and published by Asakura Shoten, 1976)) maybe further laminated according to the above-mentioned method. The reflective film layer 87 should preferably have a thickness of 0.01 $\mu$m to 50 $\mu$m. The reflective film layer 87 may be formed in a pattern by a photolithographic method, a masking vacuum deposition method or the like.

Where the reflective film layer 87 is formed between the underlying layer 81 and the thin film layer 83 of the transfer laminate, the transfer laminate 79 is laminated in contact with the concave and convex configuration-bearing thin film layer 83 of the application substrate 85 after removal of the cover film, if present, followed by the underlying layer 81 from the reflective film layer 87 (including the removal of the base film 82), thereby making a diffuse reflector plate (see FIG. 14E) The transfer laminate 79 can be applied to the application substrate 85 in the same manner as stated above. Thereafter, actinic light 86 such as UV light may be irradiated in the same manner as set out hereinbefore.

Prior to the lamination of the transfer laminate 79 on the substrate in such a way as to be in contact with the thin film layer, the substrate may be rinsed with a chemical solution for the purpose of improving adhesion, an adhesive may be applied onto the substrate, or a method of irradiating UV light or the like to the substrate may be used. For a device of laminating the transfer laminate 79 on the application substrate 85, it is preferred to use a roller laminator by which the application substrate 85 is sandwiched between a heating and pressing rubber roller and a base film, rotating the roller to feed out the substrate while holding the transfer laminate against the application substrate 85.

The thickness of the thin film layer formed on the surface of the application substrate in this manner is preferably within a range of 0.1 $\mu$m to 50 $\mu$m. When the thin film layer 83, prior to the holding of the concave and convex configuration-bearing underlying layer 81, has a thickness larger than a peak-to-valley value of the concave and convex configuration in the underlying layer 81, the concave and convex pattern is likely to be reproduced. If the thickness is equal to the value, the thin film layer 83 may be broken through with the convex portions of the underlying layer to make a flat portion, with the possibility that diffuse reflection is unlikely to obtain in a high efficiency.

Where a negative-type photosensitive resin is used for the thin film layer 83, a photosensitive portion is exposed to by means of an exposing device, as shown in FIG. 14C, in order to impart shape retention thereto. The exposing device usable in the present invention includes a carbon arc lamp, a super high pressure mercury vapor lamp, a high pressure mercury vapor lamp, a xenon lamp, a metal halide lamp, a fluorescent lamp, a tungsten lamp or the like.

The exposing device may be a parallel aligner for forming patterns such as pixels and BM (black matrix). Nevertheless, any devices may be used provided that preliminarily formed concave and convex configurations can be cured. To this end, a quantity of light more than an exposure capable of curing a photosensitive resin should be provided. Accordingly, a UV irradiation system, which is usually utilized as a substrate cleaning device and makes use of scattered light built in a line. Using this type of system, fabrication is made more inexpensively than by a technique using a photomask, and a tolerance to an exposure is greater than in the case using a photomask. The exposure can be performed prior to or after the separation of the provisional supports of the base film 82 and the underlying layer 81. For improving adhesion to and follow-up action of the substrate, a cushion layer may be formed on the base film.

In the practice of the invention, where the thin film layer 83 is formed on the application substrate 85 beforehand and the concave and convex pattern-bearing film made of the underlying layer 81 and the base film 82 is held against the thin film layer 83, the thin film layer 83 and the forming method thereof may be similar to those set forth hereinbefore, respectively. It should be noted that the thin film layer 83 is preferably exposed to light after holding of the concave and convex pattern.

Figure 15:
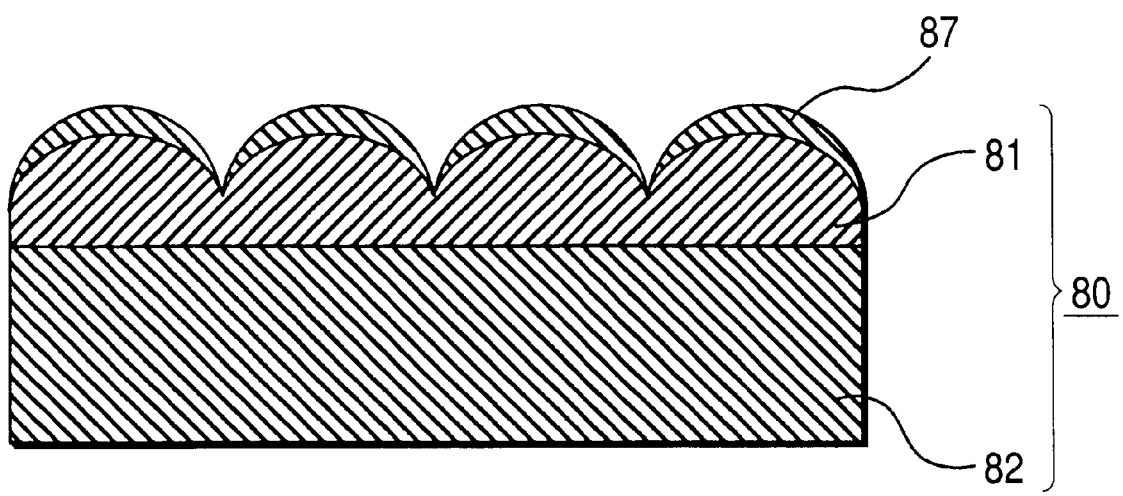
FIG. 15 is a sectional view showing an example of a diffuse reflector plate according to the invention.

When the reflective film layer 87 is laminated on the concave and convex surfaces of the concave and convex pattern-bearing film 80 to obtain a diffuse reflector plate. FIG. 15 shows an example of a diffuse reflector plate obtained according to this method.

FIG. 15 is a sectional view of an example of a diffuse reflection plate according to the invention. In the figure, the underlying layer 81 is formed on the base film 82, on which the reflective film layer 87 is laminated. The method for forming the reflective film layer 87 on the concave and convex surfaces of the concave and convex pattern-bearing film can be carried out in the same manner as set forth hereinabove.

The reflection-type LCD device using the diffuse reflector plate according to the invention is illustrated with reference to FIG. 16.

Figure 16:
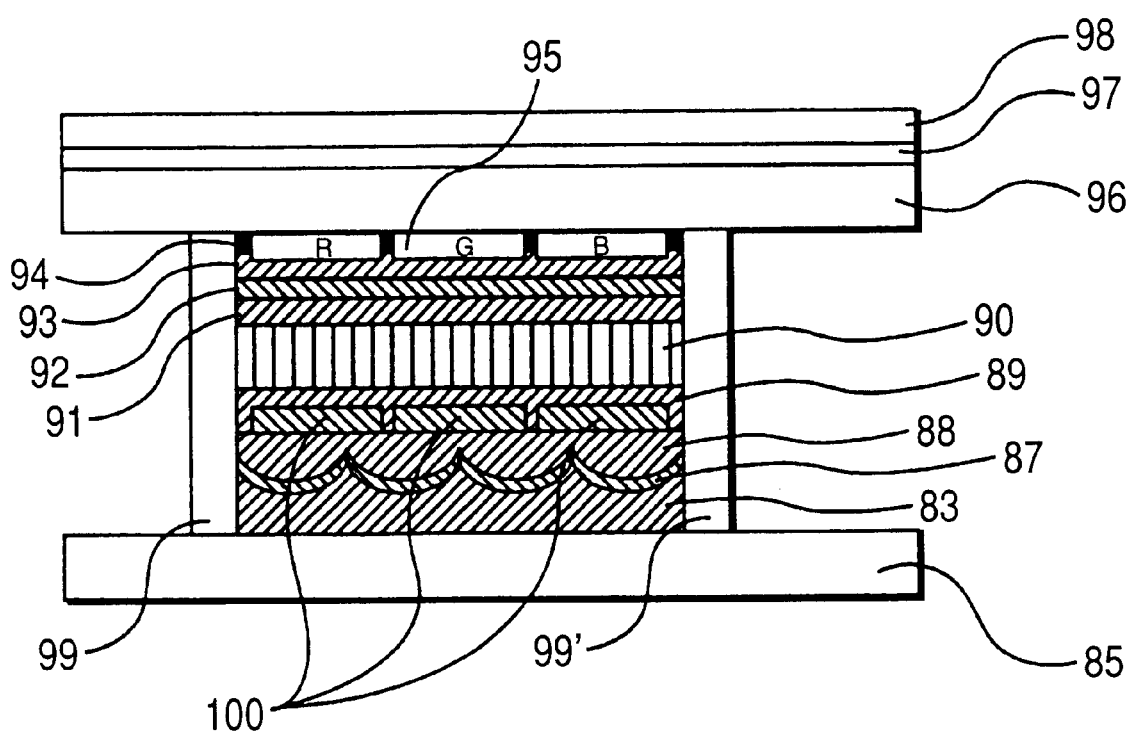
FIG. 16 is a side view, partially in section, of an example of a reflection-type LCD device according to the invention.

FIG. 16 is a side view, partially in section, of an example of a reflection-type LCD device according to the invention.

In the figure, the thin film layer 83 and the reflective film layer 87 are, successively, laminated on the application substrate 85, made of glass substrate, the concave portions to form a diffuse reflector plate. A planarizing or flattening film 88 is filled up in the concave portions of the diffuse reflector plate to form a flat surface. Transparent electrodes 100 are, respectively, formed on the planarizing film 88, over which an alignment film 89 is formed. In this way, one liquid crystal holding substrate is constituted. On the other hand, a black matrix 94 and a color filter 95 are formed on a surface of a glass substrate 96 which is in face-to-face relation with the application substrate 85, and after further formation of a planarizing film 93, a transparent electrode 92 and an alignment film 91 are, successively, laminated. The glass substrate 96 has a phase difference film 97 and a polarizing plate 98 formed on the other side thereof. In this manner, another liquid crystal holding substrate is formed. The two liquid crystal holding substrates are so arranged that the alignment film 91 and the alignment film 88 are facing, and a liquid crystal 90 is accommodated in a space established along with spacers 99, 99'.

Although the reflection-type LCD display device has been described hereinabove, for instance, the diffuse reflector plate of the invention can be used in devices that require diffuse reflection of external light. For instance, a diffuse reflector plate is provided for the purpose of improving the efficiency of a solar cell.

The concave and convex pattern film 80 made of the underlying layer 81 and the base film 82 can be used for the manufacture of a light-shielding plate, a decoration plate, frosted glass, a white board for projection screen, an optical filter, a condensing plate, an extinction plate and the like. Thus, the concave and convex pattern film 80 of the invention can be transferred to any of a glass plate, a synthetic resin plate, a synthetic resin film, a metal plate and a metal foil. The substrate surface to be transferred may be not only flat, but also curved or steric.

It will be noted that the underlying layer 81 may be laminated on the application substrate 85 in the transfer laminate of the invention. For this purpose, the underlying layer 81 and the base film 82 are so arranged that they have to be peeled off therebetween. Several reasons why the underlying layer 81 is laminated on the application substrate 85 are considered: to have the underlying layer 81 functioned as an electric insulating layer in case where the reflective film layer 87 is used as an electrode; to have the underlying layer 81 served as a planarizing layer for the concave and convex configurations of the reflective film layer 87; to have the underlying layer 81 served as an etching resist for the reflective film layer 87, in which a photosensitive resin is used as the underlying layer 81; and to have the underlying layer 81 served as a partial light-shielding layer for the reflective film layer 87, in which the underlying layer is colored.

More specific examples are described below.

Microlens configurations, each having a depth of 0.6 μm, were formed within a region of a 15 mm square at the center of a 45 mm square and 20 mm thick stainless substrate by means of a diamond bite according to a cutting system of the invention to make a transfer pattern master.

Next, a 100 μm thick polyethylene terephthalate film was provided as abase film, and a photocurable resin solution having the following formulation was coated onto the base film by means of a (coating machine) in a dry thickness of 20 μm and dried. Subsequently, the transfer master patter was held against the coated film, followed by irradiation of UV light to cure the photocurable resin and peeled off from the transfer master pattern, thereby obtaining a concave and convex pattern-bearing film wherein the concave and convex forms or configurations are formed in the surface of the photocured resin layer (underlying layer).

Formulation of the photocurable resin solution (for underlying layer): Acrylic acid/butyl acrylate/vinyl acetate copolymer . . . 5 parts by wt.

| | |
|---|---|
| Butyl acetate (monomer) | 8 parts by wt. |
| Vinyl acetate (monomer) | 2 parts by wt. |
| Acrylic acid (monomer) | 0.3 parts by wt. |
| Hexanediol acrylate (monomer) | 0.2 parts by wt. |
| Benzoin isobutyl ether (initiator) | 2.5 wt % |

Next, a solution for the formation of a thin film layer having the following formulation was applied onto the photocurable resin layer (underlying layer) having concave and convex configurations formed therein by means of a coating machine in a dry average thickness of 8 μm and dried, followed by covering with a polyethylene film as a cover film to obtain a transfer film.

Formulation of the solution for formation of a thin film layer:

For a polymer, a copolymer resin (polymer A) of styrene, methyl methacrylate, ethyl acrylate, acrylic acid and glycidyl methacrylate was used. The molecular weight was at about 35, 000, and an acid value was at 110. Parts are by weight (herein and whenever it appears hereinafter.)

| | |
|---|---|
| Polymer A | 70 parts |
| Pentaerythritol tetraacrylate (monomer) | 30 parts |
| Irgacure 369 (commercial name of Ciba-Geigy AG (initiator) | 2.2 parts |
| N,N-Tetraethyl-4,4'-diaminobenzophenone (initiator) | 2.2 parts |
| Propylene glycol monomethyl ether (solvent) | 492 parts |
| p-Methoxyphenol (polymerization inhibitor) | 0.1 part |
| Perfluoroalkyl alcoxylate (surface active agent) | 0.01 part |

While peeling the cover film of the transfer film, the transfer film was laminated on a glass substrate by use of a laminator at a substrate temperature of 90° C., a roll temperature of 80° C., a roll pressure of 7 kg/cm2 and at a rate of 0.5 m/minute in such a way that the thin film layer was in contact with the glass substrate to obtain a substrate having, on the glass substrate, the thin film layer, the photocurable resin layer (underlying layer) and the base film laminated. Next, the photocurable resin layer (underlying layer) and the base film were peeled off to obtain the thin film layer shaped like the concave and convex configurations of the transfer master pattern on the glass substrate. This was subjected to thermal curing in an oven at 230° C. for 30 minutes, followed by vacuum deposition to laminate a 0.2 μm thick aluminium thin film and thus form a reflective layer.

A second example is now described.

The concave and convex surfaces of the concave and convex pattern film was laminated with a 0.2 μm thick aluminium thin film by vacuum deposition. This was satisfactory with respect to the reflection intensity over a range of an incidence angle of −40° to 40°, and thus, a diffuse reflector plate having excellent reflection characteristics was obtained.

Next, a third example is illustrated.

Such a solution for formation of a thin film layer as used in the first example was applied onto a glass substrate serving as a permanent substrate and spin-coated at 2000 r.p.m., for 15 seconds, followed by heating by means of a hot plate at 90° C. for 2 minutes to obtain a 8 μm thick thin film layer. Next, the concave and convex pattern-bearing film of the first example was laminated in contact with the thin film layer by use of a laminator at a substrate temperature of 90° C., a roll temperature of 80° C., a roll pressure of 7 kg/cm2, and a rate of 0.5 m/minute to obtain a substrate including, on the glass substrate, the thin film layer, the photocurable resin layer (underlying layer) and the base film. This was irradiated with UV light by means of an aligner, and the photocurable resin layer (underlying layer) and the base film were peeled off to obtain the thin film layer having the same concave and convex pattern of the transfer master pattern on the glass substrate. Next, thermal curing was performed in an oven at 230° C. for 30 minutes, followed by lamination of a 0.2 μm thick aluminium thin film by a vacuum deposition method to form a reflective layer. Thus, a diffuse reflector plate was obtained. This was satisfactory with respect to the reflection intensity over a range of an incidence angle of −40° to 40°, and thus, the resultant diffuse reflector plate was excellent in reflection characteristic.

As stated hereinabove, the lens face of the microlens configuration of the invention can be formed according to a cutting system, and the lens configuration based on the values of design is available. Moreover, an aspheric lens face configuration can be created, and thus, the resulting microlens becomes high in the degree of freedom with respect to the optical design. When using a reflector plate wherein such configurations are arranged at uneven pitches, the resulting reflector plate is so excellent as to have the reflection characteristic based on the values of design.

When using the microlens configuration-bearing transfer master pattern, the concave and convex pattern and the laminate for transfer according to the invention, a diffuse reflector pattern, which is used in a reflection-type liquid crystal display device or the like and has good reflection characteristics, can be made. When the concave and convex faces are appropriately formed beforehand, the reflection characteristics of the diffuse reflector plate can be arbitrarily controlled and reflection characteristics can be reproducibly obtained. In addition, a surface profile having a given function can be readily, appropriately given to the substrate.

As stated hereinbefore, according to the invention, the lens configurations based on the values of design are available according to the cutting system, and the aspheric lens configuration can be created, so that microlenses having a high degree of freedom of optical design can be obtained.

Further, a reflector plate having excellent reflection characteristics based on the values of design can be obtained. The appropriate preset of the concave and convex faces permits the reflection characteristics of the diffuse reflector plate can be arbitrarily controlled with the reflection characteristics being obtained reproducibly. The surface profile having a given function can be readily given to an appropriate substrate.

The invention may be embodied in other specific forms without departing from the spirit or essential characteristics thereof. The present embodiments are therefor to be considered in all respects as illustrative and not restrictive, the scope of the invention being indicated by the appended rather than by the foregoing description and all changes which come within the meaning and rage of equivalency of the claims are therefore intended to be embraced therein.

What is claimed is:

1. A method for making a diffuse reflector plate, which comprises the steps of:

making a transfer master pattern for a reflector plate member including forming a nose profile of a diamond chip of a cutting tool in a same form as a sectional form of one of a major axis and a minor axis of a microlens, and controlling a locus of the cutting tool in coincidence with a sectional form of the other axis to process a die thereby forming a microlens configuration in the die, wherein the microlenses, respectively, have a substantially circular profile and have a major axis and a minor axis, which pass through the center of a circle and intersect at 90 degrees, being equal in length to each other, sectional forms of faces vertical to an axis parallel to the minor axis or the major axis having a same radius size at any position;

holding the transfer master pattern against a substrate to be transferred, thereby forming a concave and convex pattern;

providing the concave and convex pattern as a provisional support, laminating a thin film layer on a concave and convex pattern surface of the provisional support, and bonding an application support with a surface of the thin film layer opposite to the surface in contact with the provisional support, and laminating a protecting film on the bonding surface of the thin film layer so as to form a laminate for transfer; and holding the laminate for transfer, from which the protecting film has been separated, against an application substrate in such a way that the bonding surface of the thin film layer is in contact with the application substrate.

2. A liquid crystal display device, characterized by comprising a diffuse reflector plate made according to the method defined in claim 1.

3. A method according to claim 1, wherein said microlenses are formed on a plane at uneven pitches, and a pitch between adjacent microlenses is within a range of 50 to 100% of a lens radius of the said microlenses.

4. A method for making a diffuse reflector plate, which comprises the steps of:

making a transfer master pattern for a reflector plate member including forming a nose profile of the diamond chip of a cutting tool in a same form as a sectional form of one of a major axis and a minor axis of a microlens, and controlling a locus of the cutting tool in coincidence with a sectional form of the other axis to process a die thereby forming a microlens configuration in the die, wherein the microlenses, respectively, have a major axis and a minor axis intersecting at 90 degrees and are so arranged that sectional forms of faces vertical to an axis parallel to the minor axis or the major axis are, respectively, made of the same curved line or a same combination of a curved line and a straight line in respective directions at any position;

holding the transfer master pattern against a substrate to be transferred, thereby forming a concave and convex pattern;

providing the concave and convex pattern as a provisional support, and laminating a thin film layer on a concave and convex pattern surface of the provisional support, wherein a surface of the thin film layer opposite to the surface in contact with the provisional support serves as a bonding surface with an application substrate so as to provide a laminate for transfer in which a protecting film is laminated on the bonding surface of the thin film layer;

holding the laminate for transfer, from which the protecting film has been separated, against an application substrate in such a way that the bonding surface of the thin film layer is in contact with said application substrate;

separating the provisional support; and forming a reflective film on the concave and convex surface of the concave and convex pattern.

5. A liquid crystal display device, characterized by comprising a diffuse reflector plate made according to the method defined in claim 4.

6. A method according to claim 4, wherein said microlenses are formed on a plane at uneven pitches, and a pitch between adjacent microlenses is within a range of 50 to 100% of a width of said microlenses.

7. A method for making a diffuse reflector plate, characterized by comprising the steps of:

making a transfer master pattern for a reflector plate member including of forming a nose profile of a diamond chip of a cutting tool in a same form as a sectional form of one of a major axis and a minor axis of a microlens, and controlling a locus of the cutting tool in coincidence with a sectional form of the other axis to process a die thereby forming a microlens configuration in the die, wherein the microlenses, respectively, have a substantially circular profile and have a major axis and a minor axis, which pass through the center of a circle and intersect at 90 degrees, being equal in length to each other, sectional forms of faces vertical to an axis parallel to the minor axis or the major axis have a same radius size at any position;

holding the transfer master pattern against a substrate to be transferred, thereby forming a concave and convex pattern;

holding the concave and convex pattern against a thin film layer formed on a protecting substrate so that a concave and convex surface is in contact with the thin film layer;

separating the concave and convex pattern; and forming a reflective film on a surface on which the concave and convex surface of the thin film layer has been transferred.

8. A liquid crystal display device, characterized by comprising a diffuse reflector plate made according to the method defined in claim 7.

9. A method according to claim 7, wherein said microlenses are formed on a plane at uneven pitches, and a pitch between adjacent microlenses is within a range of 50 to 100% of a lens radius of the said microlenses.

10. A method for making a diffuse reflector plate, characterized by comprising the steps of:

making a transfer master pattern for a reflector plate member including forming a nose profile of a diamond chip of a cutting tool in a same form as a sectional form of one of a major axis and a minor axis of a microlens, and controlling a locus of said cutting tool in coincidence with a sectional form of the other axis to process a die thereby forming a microlens configuration in the die, wherein the microlenses, respectively, have a major axis and a minor axis intersecting at 90 degrees and are so arranged that sectional forms of faces vertical to an axis parallel to the minor axis or the major axis are, respectively, made of a same curved line or a same combination of a curved line and a straight line in respective directions at any position;

holding the transfer master pattern against a substrate to be transferred, thereby forming a concave and convex pattern;

holding the concave and convex pattern against a thin film layer formed on a protecting substrate so that a concave and convex surface is in contact with the thin film layer;

separating the concave and convex pattern; and forming a reflective film on a surface on which the concave and convex surface of the thin film layer has been transferred.

11. A liquid crystal display device, characterized by comprising a diffuse reflector plate made according to the method defined in claim 10.

12. A method according to claim 10, wherein said microlenses are formed on a plane at uneven pitches, and a pitch between adjacent microlenses is within a range of 50 to 100% of a width of said microlenses.

13. A diffuse reflector plate comprising:

a concave and convex pattern formed by holding a transfer master against a substrate to be transferred, the transfer master pattern being for a reflector plate member and made by forming a nose profile of a diamond chip of a cutting tool in a same form as a sectional form of one of a major axis and a minor axis of a microlens, and controlling a locus of the cutting tool in coincidence with a sectional form of the other axis to process a die thereby forming a microlens configuration in the die, wherein the microlenses, respectively, have a substantially circular profile and have a major axis and a minor axis, which pass through a center of a circle and intersect at 90 degrees, being equal in length to each other, sectional forms of faces vertical to an axis parallel to the minor axis or the major axis have a same radius size at any position; and a reflective film laminated on a concave and convex surface of said concave and convex pattern.

14. A diffused reflector plate according to claim 13, wherein said microlenses are formed on a plane at uneven pitches, and a pitch between adjacent microlenses is within a range of 50 to 100% of a lens radius of the said microlenses.

15. A diffuse reflector plate comprising:

a concave and convex pattern which is formed by holding a transfer master pattern against a substrate to be transferred, the transfer master pattern being for a reflector plate member and made by forming a nose profile of a diamond chip of a cutting tool in a same form as a sectional form of one of a major axis and a minor axis of a microlens, and controlling a locus of the cutting tool in coincidence with a sectional form of the other axis to process a die thereby forming a microlens configuration in the die, wherein the microlenses, respectively, have a major axis and a minor axis intersecting at 90 degrees and are so arranged that sectional forms of faces vertical to an axis parallel to the minor axis or the major axis are, respectively, made of a same curved line or a same combination of a curved line and a straight line in respective directions at any position; and a reflective film laminated on a concave and convex surface of said concave and convex pattern.

16. A diffused reflector plate according to claim 15, wherein said microlenses are formed on a plane at uneven pitches, and a pitch between adjacent microlenses is within a range of 50 to 100% of a width of said microlenses.

* * * * *